United States Patent

[11] 3,579,195

[72] Inventors T. Milton Hallmark; John M. Woodward, Lexington, Ky.

[21] Appl. No. 773,471
[22] Filed Nov. 5, 1968
[45] Patented May 18, 1971
[73] Assignee International Business Machines Corporation Armonk, N.Y.

[54] DATA SYSTEM INCORPORATING METHOD AND APPARATUS FOR REFERENCING MEDIA LOCATIONS
50 Claims, 18 Drawing Figs.

[52] U.S. Cl. .......... 340/172.5, 340/174.1
[51] Int. Cl. .......... G06f 13/04
[50] Field of Search .......... 340/172.5, 174.1; 235/61.11

[56] References Cited

UNITED STATES PATENTS

| | | | |
|---|---|---|---|
| 3,049,291 | 8/1962 | Greenhalgh et al. | 235/61.11 |
| 3,069,666 | 12/1962 | Austin | 340/174.1 |
| 3,206,133 | 9/1965 | Forster et al | 340/174.1 |
| 3,248,030 | 4/1966 | Ganzhorn | 226/33 |

*Primary Examiner*—Paul J. Henon
*Assistant Examiner*—Mark Edward Nusbaum
*Attorneys*—Hanifin and Jancin and D. Kendall Cooper

ABSTRACT: The invention concerns a data processing system that includes methods and apparatus for establishing accurate referencing of data locations on a storage media, such as a magnetic tape record media. The system includes a central processor interconnected with a magnetic tape unit having character registers therein and normally operable under command from the processor to read a tape media at relatively high speeds, the data so derived being supplied through the registers to the processor for additional processing. The magnetic tape unit drive is coupled to a disc and photodetection means that supplies coded indications of data locations on the media. The tape unit is operable in a forward direction upon receiving a Read command from the processor and operable in a reverse direction upon receiving a Write-Backspace command, the latter command establishing a pseudowrite operation. In the event the processor does not accept the data characters, or changes commands, or detects an error, provision is made for an overrun operation. During this operation, the last character location not transferred is accurately referenced by counting means while the media is brought to a stop, repositioned in the opposite direction to a point sufficiently removed to insure sufficient acceleration for accurate data reading, and again started in the selected direction during which the overrun occurred. The system inherently provides insurance against mechanical jitter or other mechanical inconsistencies. The system combines counting of character locations on the media with a direction memory to insure that access of characters is accurately maintained.

INVENTORS
T. MILTON HALLMARK
JOHN M. WOODWARD

BY D. Kendall Cooper
ATTORNEY

SPROCKET DRIVE, BRAKE AND TIMING DISC

BRAKE ASSEMBLY AND MAGNET

DISC AND COUNTING LOGIC

NORMAL DRIVE FORWARD-OVERRUN

NORMAL DRIVE FORWARD-OVERRUN

DRIVE FORWARD COMMAND FOLLOWED BY DRIVE FORWARD COMMAND

DRIVE FORWARD COMMAND FOLLOWED BY DRIVE REVERSE (WRITE BACKSPACE) COMMAND

NORMAL DRIVE REVERSE-OVERRUN (WRITE BACKSPACE)

DATA SYSTEM INCORPORATING METHOD AND APPARATUS FOR REFERENCING MEDIA LOCATIONS

BRIEF BACKGROUND OF INVENTION, INCLUDING FIELD AND PRIOR ART

A number of techniques have been proposed heretofore for referencing data locations on a media, such as a magnetic tape. As an example, in one system, when an overrun condition is detected, the tape is marked and means are provided for sensing the mark in order to gate the required characters to the processor following stopping, reversing, and repositioning of the tape. Such a system is not insensitive to jitter as is the present system. In other systems, such as U.S. Pat. No. 3,248,030, to Ganzhorn, assigned to the same assignee as the present invention, counting means is provided that is operable to count character locations occurring during deceleration of a tape media following the receipt of a Stop command and that control the tape driving means to return just prior to the last character not transferred to an interconnected processor. Ganzhorn is operable only in one direction and provides for no acceleration zone as in the present system. A technique like that taught by Ganzhorn is sometimes useful in locating defects in a tape record media where no need exists for operation in both forward and reverse directions or repositioning in connection with such operations, and wherein no acceleration zone is required. Provision has been made in some prior systems to couple a timing disc directly to the same drive shaft as that provided for the tape media and to make use of the timing disc marks through photodetection circuitry to sense movement of the tape media as, for example, for the purpose of energizing clutch and brake circuits. No such system is known wherein the timing disc is coded in such a manner that it serves to indicate individual character locations, speed of movement of the media, as well as direction of movement of the media as taught herein.

SUMMARY

The invention concerns the accurate referencing of locations on a media, such as a magnetic tape, and is particularly effective in a data system including a processor that is interconnected with a tape processing unit for the high speed reading and the transfer of individual characters of information. The individual characters on the media are located at predetermined equally spaced intervals along the direction of movement of the media. Provision is made in the tape unit for driving the media both in the forward and reverse directions with associated forward and reverse clutch members and the unit incorporates a braking device for insuring fast stops of the media drive mechanisms when required. In a typical case, the tape unit senses characters at a rate of 900 characters per second. Directly associated with the same drive shaft as that used for driving the media is a timing disc having three concentrically positioned series of apertures designated Strobe R, A, and B. The A and B sets of apertures combine to provide a binary count of 1, 2, 3, in the forward direction and 3, 2, 1, in the reverse direction. The coded representations on the timing disc have a one to one relationship with the character locations on the magnetic tape. Photodetection means associated with the timing disc derive signals that are indicative of character locations, speed of movement of the tape and direction of movement as determined by the sequence in which the coded combinations are sensed. The tape unit has a data path for transfer of characters from the tape to the processor that includes the sense amplifier circuits, a buffer register, a data register, and line driver circuits, in that order. Line receiver circuits are also provided to receive characters from the processor. The tape unit and processor are interconnected by cables that carry both the data signals, status signals, and command signals from the processor.

High speed reading of the tape media in the forward direction is initiated by combined depression of a Start button on the tape unit and receipt of a Read command from the processor. Characters sensed are transferred individually through the data path just described. This occurs at a high free running speed. Conditions arise when the processor may not want to accept any further information from the tape unit, or issues a different command, or senses an error, when it is necessary to reread an entire block of information on the tape. Various conditions, such as the foregoing, are recognized in the tape unit to establish an overrun and repositioning operation during which the tape is stopped, moved in the opposite direction sufficiently far to establish an acceleration zone and thereafter again moved in the same direction, whether forwardly or reversely that it was moving in when the overrun condition occurred. If the overrun condition occurs during a Drive Forward status (Read command) or a Drive Reverse status (Write-Backspace) the last character not transferred through the data path is accurately referenced by initiating counting operation of a Stop Counter which is incremented and decremented, as appropriate, regardless of the direction of movement of the tape and the extent of movement of the tape to again locate the required character and thereby insure the accurate transfer of the data on the tape. The tape unit includes a direction detection circuit and a direction memory that combine with the timing disc outputs to increment and decrement the Stop Counter, as required during the overrun and repositioning operations. The overrun and repositioning concepts described herein may be initiated by internally recognized conditions existing in the tape unit itself, such as the registers being loaded and not available to accept additional characters or externally provided signals such as a change in command from the processor. Regardless of mechanical bouncing or jitter encountered during the high speed movement, deceleration, change in direction, and acceleration intervals, the present system accurately maintains the required reference on tape since the counter is incremented or decremented, as necessary, even under such conditions. The method and apparatus disclosed herein is adaptable to numerous types of referencing situations and various kinds of record media, including belts, rectilinear media, and the like.

OBJECTS

Accordingly, an object of the present invention is to provide for accurate referencing of information on a storage media.

A further object of the invention is to provide a system wherein data is transferred between a processor and a media sensing unit and insuring the accurate relocation of information on the media.

Still another object of the present invention is to provide for the repositioning of a storage media upon recognition of certain conditions, such as an overrun condition with accurate registration of character locations to insure that a subsequent transfer of information starts at the correct data location on the media.

A still further object of the invention is to provide a system for accurately referencing data locations on a storage media that is effective whether the media is moving in a first selected direction or in an opposite direction.

Also, an object of the invention is to provide repositioning of a record media to an accurately selected character location for continued reading following interruption of a normal reading routine due to the recognition of internal conditions, or externally initiated indications.

In this connection, a further object of the invention is to provide for repositioning of a tape media following interruption of sensing of information thereon under various circumstances, such as an overrun condition when no further information can be transferred, an error condition that requires relocation of an entire block of information, or a change in command received from an interconnected processor unit.

An additional object of the present invention is to provide a media referencing and repositioning system that is inherently insensitive to mechanical bounce and jitter.

A still further object of the invention is to provide for deceleration and acceleration zones on a media in connection with a repositioning operation, the extent of which may be variable, while still maintaining accurate reference to a predefined character location on the media.

An object of the invention is to provide a repositioning and referencing method and apparatus effective with a media that is movable in opposite directions with a variance in the media referencing function depending upon the direction of movement of the media.

The foregoing another objects, features, and advantages of the invention will be apparent from the following more particular description of various embodiments of the invention as illustrated in the accompanying drawings.

GENERAL SYSTEM DESCRIPTION

Figure 1:
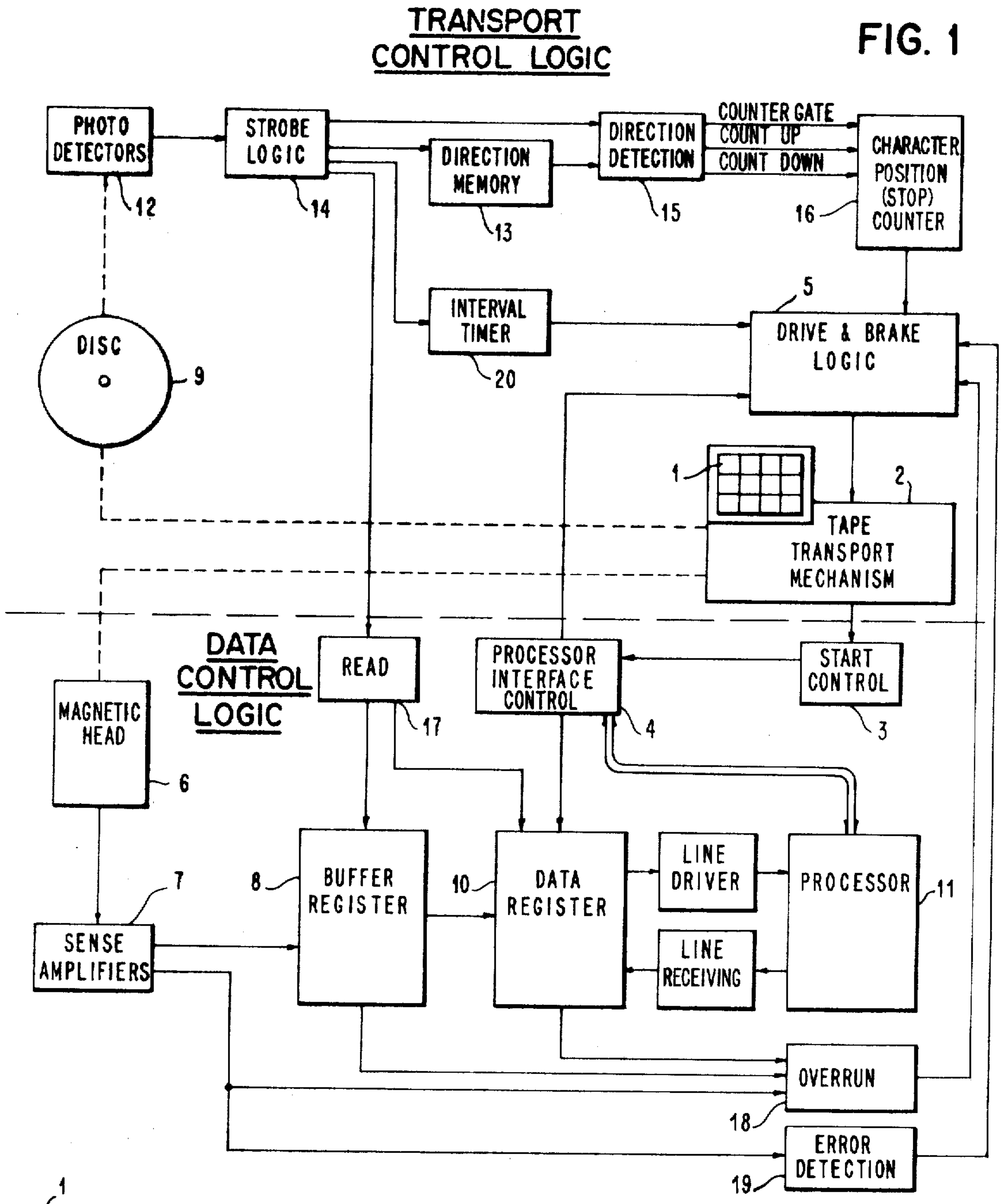
FIG. 1 is a diagram of a data system incorporating the apparatus of the present invention for data referencing and repositioning and including a tape transport unit generally situated in the upper half of the FIG. and data control logic positioned in the lower half of the FIG.

FIG. 1 is a block diagram of a preferred embodiment of the present invention. The invention finds utility in a system that includes a processor, such as the IBM 360 models 30, 40, and 50 series, that is interconnected through an Input/Output Interface (channel) with a tape reading unit for the high speed reading and transfer of data from a magnetic tape media. While not shown in detail herein, the tape unit may have provision for loading, unloading (stacking) and scanning a plurality of tape cartridges automatically and in succession, without operator intervention. A suitable tape unit embodying features of the present invention is the IBM Model 2495 Tape Cartridge Reader.

In a typical case, the tape unit in the system disclosed herein accommodates at least one tape cartridge containing a tape record media that, as an example, is previously recorded on another device, such as the IBM Magnetic Tape "Selectric" Typewriter (MT/ST), the characteristics and operation of which are fully described in U.S. Pat. No. 3,297,124, to Sims. Another possible source for the tape record media is the IBM Model 50 Magnetic Data Inscriber. Both of these units record 9-bit bytes including eight data bits and one parity bit.

In the Sims' apparatus, provision is made for positioning and feeding a magnetic tape for a cartridge for the purpose of recording and reading information. The Sims' apparatus comprises a tape console that has an associated "Selectric" printer for entry and printing purposes. Information in the Sims' apparatus is entered from the printer keyboard as well as from code buttons on the tape console. The information is generally recorded serially by character and serially by bit with a magnetic head moving transversely across the media to record or read each character. The tape is incremented following such recording or reading to position it for the next character.

Accurate tape to head registration in the Sims' apparatus is insured by a detent mechanism that cooperates with an incrementing gear mechanism attached to the tape drive shaft.

In contrast with the Sims' apparatus, the present system contemplates a tape reading unit have provision for both incremental forward and reverse stepping, as well as high speed forward and reverse drive. The incremental drive control in the present system is primarily intended for use when the processor is not able to service the tape unit. That is, the processor, for some reason, may be unable to receive data from the tape unit at a normal high speed continuous transfer rate.

The forward and reverse continuous high speed driving of the tape unit is intended for the transfer of data from the magnetic tape record media through the processor interface for storage in the processor memory and subsequent processing as determined by the programs provided.

Reference is made to the IBM Manual Form A22-6843 on IBM System/360 Interface specifications for further information concerning the processor features and capabilities as well as the processor interface control.

CODES

The MT/ST code is the "Selectric" typewriter code, while the TOAKE code is the Extended BCD Interchange Code (EBCDIC). Both codes are utilized with odd parity. The tape unit handles either type of code, although not intermixed on the same cartridge.

MT/ST CODE

The MI/SI code has the full alphabet (Upper and lower case) of 52 character codes, 9 numerical character codes, 27 special character codes and 18 special function codes.

IBM MODEL 50 MAGNETIC DATA INSCRIBER CODE

This code is the EBCDIC code. Since the MT/ST code and the EBCDIC code utilize different tracks on tape for the parity bit, a bit interchange is performed in the tape unit so that parity is properly placed on Bus-In.

COMMANDS

The IBM 360 processor directs commands to the tape unit through the Interface that effect various operations. For convenience, commands of interest are summarized here.

The following commands are valid for the system.

| | Bus Out bits | | | | | | | | |
|---|---|---|---|---|---|---|---|---|---|
| Command | P | 0 | 1 | 2 | 3 | 4 | 5 | 6 | 7 |
| Test I/O | 1 | 0 | 0 | 0 | 0 | 0 | 0 | 0 | 0 |
| Basic Read | 0 | 0 | 0 | 0 | 0 | 0 | 0 | 1 | 0 |
| Sense | 0 | 0 | 0 | 0 | 0 | 0 | 1 | 0 | 0 |
| Write-Backspace | 1 | 0 | 0 | 0 | 0 | 0 | 1 | 0 | 1 |
| Control-Rewind | 0 | 0 | 0 | 0 | 0 | 0 | 1 | 1 | 1 |
| Control No-OP | 1 | 0 | 0 | 0 | 0 | 0 | 0 | 1 | 1 |

TEST I/O

Test I/O is a command that relieves the tape unit of pending status. Any outstanding status bits are presented to the channel during the initial selection of a Test I/O. If there is no outstanding status, the P-bit only is presented. This command consists only of the initial selection sequence.

READ COMMAND

The Read command causes data to be transferred from the tape unit to the channel. This command establishes conditions in the tape unit for a "Drive Forward" operation, which is essentially synonymous with a "Read" command. This command is normally executed in the multiplex mode, but the channel can force a burst mode by holding the Select-Out line up.

This command is accepted by the tape unit only when a clear status (P-bit only) is presented to the channel during initial selection.

Once the record area of the tape has been reached, data is read at approximately 1.1 msec./byte until the channel count goes to zero or the end of tape is detected. The Channel End is generated immediately and presented to the channel along with any other status generated during the Read command.

If a Unit Check is not presented with the Channel End the data transferred during the Read command is considered valid.

If Command Chaining is not indicated when the Channel End is presented, a repositioning cycle is initiated to stop the tape. The Device End is presented when the repositioning cycle is completed (approximately 300 msec.). If Command Chaining is indicated the Device End is presented immediately following the Channel End.

WRITE-BACKSPACE COMMAND

The Write-Backspace command is used to back the tape under channel control. This command establishes conditions for a "Drive Reverse" operation in the tape unit which is essentially synonymous with "Write-Backspace" as used herein. This command proceeds exactly as Read, except the channel places data on Bus-Out rather than the tape unit placing data on Bus-In. The data placed on Bus-Out is not used and the data on tape is not changed. The Service-Out, Service-In tag exchange is used to synchronize the channel count with the tape position. The Write-Backspace command is accepted by the tape unit only if a clear status (P-bit only) is presented to the channel during initial selection.

When the record area is reached, the tape unit requests data for each byte that it backs over. These requests are presented to the channel at 1.1 msec./byte. The tape is backed a block length equal to the number of bytes presented to it by the channel. The tape continues to move backward until a Command-Out response is given to Service-In or until the tape backs past the beginning of the record area.

When the stop occurs, the Channel End status is generated and presented immediately along with any other status generated up to this time.

If Command Chaining is not indicated when the Channel End is presented, a reposition cycle is initiated to stop the tape. The Device End is presented when the reposition cycle is completed (approximately 300 msec.). If Command chaining is indicated, the Device End is presented immediately following the Channel End.

SENSE COMMAND

A Sense Command proceeds as a Read command except only one byte of data is transferred. This byte is taken from the sense latches rather than from the tape. The tape unit initiates the ending sequence for a Sense command. This command is normally executed in the multiplex mode; but the channel can force a burst mode by holding the Select-Out line up.

This command is accepted only if a clear status (P-bit only) is presented to the channel during initial selection. Immediately following initial selection the sense byte is presented. The Channel End, Device End status is presented immediately following the sense byte.

CONTROL-REWIND COMMAND

The Control-Rewind command is used to unload the tape. This command is accepted only if a clear status (P-bit only) is presented to the channel during initial selection.

Immediately following the acceptance of a Control-Rewind command, the Channel End status is generated and presented to the channel. Also at this time, the tape starts rewinding to the unloaded position. The tape unit is busy during this rewinding operation.

When the tape reaches the unloaded position, a Device End is presented to the channel and the control unit goes not-ready. With automatic feed, the next cartridge is placed onto the tape reader. When the new cartridge is in place, the control unit is again made ready if the stacker is not full. The channel is signaled with a Device End. If the tape unit is selected while in the not-ready state, intervention required is indicated.

If the cartridge just rewound causes a stacker full indication, the tape unit remains in the not ready state after the next cartridge is mounted. The tape unit is again made ready when the stacker is emptied and the Start switch is depressed.

If the cartridge just rewound is the last one in the hopper, the tape unit remains in the not-ready state until additional cartridges are loaded by the operator.

CONTROL NO-OPERATION COMMAND

The Control No-Operation command is accepted only if the tape unit is not busy and the unit check is not indicated. If the command is accepted, a Channel End, Device End status byte is presented in the channel during initial selection.

ADDRESSING

The tape unit is addressed by sending eight bits of address plus a parity bit over the nine Bus-Out lines. The tape unit may be equipped with a programmable address card, with which any one of 256 eight-bit combinations is valid as an address.

STATUS BITS

The tape unit generates status indications that are used to set status latches. The status latches are reset when the status is accepted by the channel. These include:

Parity (bit P)

The parity bit is controlled to give odd parity in the status byte.

Attention (bit 0)

The attention bit is not used.

Status Modifier (bit 1)

The status modifier bit is not used.

Control Unit End (bit 2)

The control unit end bit is not used.

Busy (bit 3)

The busy bit is included in the status response when a command is received while another command is in progress. The only exception to this is when a Test I/O command is received and the Device End for the command in progress is available. A command is considered in progress from the time it is accepted until the Device End for that command is accepted by the channel.

Channel End (bit 4)

The channel-end bit is included in the status response:

a. Immediately following the transfer of the last byte of data for a Read command, Write-Backspace command, or Sense command. If the Channel End is not accompanied by a Unit Check, the data so transferred may be considered valid at this time.

b. Immediately after the acceptance of a Control Rewind command.

c. During the initial selection for a Control No-Operation command if the command is accepted.

Device End (bit 5)

The device-end bit is included in the status response:

a. After the last reposition cycle has been completed for a Read or Write-Backspace command if command chaining is not indicated.

b. After the presentation of Channel End if command chaining is indicated for a Read or Write-Backspace command.

c. After the last byte of data has been transferred for a Sense command.

d. After entering the ready state.

e. After the cartridge is unloaded during a Control-Rewind command.

Unit Check (bit 6)

The unit-check bit is included in the status response when any of the sense latches are set except during a Sense command.

Unit Exception (bit 7)

The unit-exception bit is included in the ending status of a Read command when the end of the record area on tape has been reached.

Sense Bits

A number of Sense bits are generated and recognized in the system. These are:

Parity

The parity bit is controlled to give odd parity in the sense byte.

Command Reject (bit 0)

The Command Reject bit latch is set when:

a. An invalid command is received and the control unit is not busy or holding status. A command with even parity is not considered an invalid command.

b. A Read command is received when the tape is positioned at the end of the record area.

c. A Control Rewind or Write-Backspace command is received when the tape is in the unload position.

Intervention Required (bit 1)

The Intervention Required bit latch is set when the control unit is in the not-ready state.

Bus-Out Check (bit 2)

The bus-out check bit latch is set anytime a command appears on Bus-Out when even parity.

Equipment Check (bit 3)

The equipment-check bit is not used.

Data Check (bit 4)

The data-check bit latch is set if a byte with even parity is detected in the data register during a Read command. The parity is checked as the information is placed on Bus-In from the data register. The P bit of Bus-In is controlled to insure an odd parity presentation to the channel independent of the parity of the data register.

Overrun (bit 5)

The overrun bit is not used.

Position Check Bit (bit 6)

The position-check bit can be set during a Read or Write-Backspace command. This bit indicates that the command has positioned the tape beyond the record area.

If during a Read command the end of the record area is reached without detecting an end of tape code, a position check is indicated.

During a Write-Backspace command, a position check is indicated if the tape is backed past the beginning of the record area.

End of File (bit 7)

When the last stack of cartridges of a file is loaded into the hopper of the auto-loader, the End of File switch should be depressed. The end-of-file bit is set when the end of the last tape in the hopper is reached.

Reset

The sense latches are reset if a status response not containing Busy is given during initial selection of a command other than Test I/O, Sense, or Control No-Operation.

OUTLINE OF OPERATIONS

Read Tape

Initial Cartridge Load

A stack of up to ten cartridges may be placed in the auto loader hopper. When the load key is depressed the first cartridge is placed on the tape reader and the tape unit made ready. This action signals the channel with a Device End. After the Device End is accepted by the channel the tape unit is ready to accept a Read command.

The first Read command issued to the tape unit after the cartridge is loaded causes the tape to enter the tape path and reading to begin. Since the tape must be loaded for this first Read command, there is approximately a one second delay between acceptance of the command and the time the record area of the tape is reached.

The power train and tape path are similar to the MT/ST in the Sims' patent. A stationary mounted, 9-track head is used. Magnetic tape is moved past the head when a solenoid actuated spring clutch couples the sprocket shaft to the torque limiter shaft. Tension is applied to the tape by a bias clutch operating through the cartridge hub. A solenoid actuated rewind clutch couples the rewind shaft to the cartridge hub.

The tape is brought to a half by applying a brake to the sprocket shaft. A magnet actuated, friction brake is used.

The hook on a leader engages the eyelet on the tape when a cartridge is loaded. When tape is loaded into the machine, the leader guides the tape past the read head and into the tape bin. The reverse is true when rewinding.

Data Flow

After the record area of the tape is reached, the read gate is turned on and the first byte is assembled in the buffer register. When the read gate is turned off, the byte in the buffer register is transferred to the data register, When the transfer is complete the control unit requests service for the byte in the data register and the read gate is again turned on. When the read gate is turned off, the second byte, which is now assembled in the buffer register, is transferred to the data register only if the first byte has been accepted by the channel and cleared.

Reposition to Prevent Overrun

If the channel does not accept the first character so that the buffer register is still full when a bit of the third byte is detected, a repositioning cycle is initiated to prevent an overrun. The tape positioning logic is referenced to the third byte. The first two bytes are in storage and available to the channel during the repositioning cycle. These two bytes are serviced with two separate requests and not sent in a burst mode unless the channel is forcing a burst mode. The reposition cycle requires approximately 300 msec. When the reposition cycle is completed and when the buffer register has been cleared the tape begins accelerating again in the forward direction to read the third character. This acceleration time is approximately 100 msec. Reading will continue without a reposition cycle if a request for service is honored within 1 msec. after Request-In is raised.

Termination

The read operation is normally terminated when the channel byte count goes to zero. When the channel responds with a Command-Out to a service request, the byte in the data register is not reset.

Request-In is raised to present the Channel End status to the channel. The tape continues to drive forward until the buffer register is also full and an overrun is anticipated. At this time, a reposition cycle is initiated. When the repositioning cycle is complete, Device End is presented to the channel. At this time the first two bytes of the next block are in storage. If another Read command is issued, the tape begins to accelerate and read the third byte of the next block. There is approximately a 100 msec. delay between the time the command is accepted until the third byte is reached. The two characters in storage can be accepted by the channel during the acceleration period.

Back Tape

If a Write-Backspace command is issued following a Read command there is approximately a 500 msec. delay between the time the command is accepted and the time the first byte to be backed over is reached. The first byte is the last byte which was accepted by the channel during the previous Read command.

The command then proceeds exactly as Read, requesting service for each byte that is backed over. The same overrun protection is provided during Write-Backspace as is provided during Read.

When the command is terminated a reposition cycle occurs. This results in approximately a 300 msec. delay between Channel End and Device End. After Device End, if another Write-Backspace command is issued there is approximately 100 milliseconds required for acceleration of the tape. During this acceleration time, however, two bytes may be serviced by the channel.

If a Read command is issued following the Write-Backspace command a turn around and acceleration time of approximately 500 msec. are required. This delay appears between acceptance of the command and the first byte of data presented to the channel. The first two bytes of the block to be read are not in storage for this case.

Command Chaining

When several Read commands are to be issued in a row, command chaining may be used to eliminate the reposition cycle and acceleration time normally associated with the termination of a tape moving command. If command chaining is indicated when the Channel End is presented to the channel, the Device End is generated and presented immediately. These two status bytes are normally presented in a multiplex mode.

If command chaining is to be effective, the two status bytes should be accepted and the next command issued within 1.1 msec. from the time when the Request-In line was raised to present the last data byte of the previous command. If the next command is not issued in time a reposition cycle is initiated to prevent an overrun.

COMMAND SEQUENCES

The tape unit accepts any sequence of valid commands.

Resets

Selective and System Reset

When a selective or a system reset is issued by the channel the tape unit takes the following action:

a. All information is removed from the tag and bus lines.
b. The machine is reset but does not leave the ready state if it was ready when the reset was issued.
c. Unloads the tape.

The tape unit is busy during the rewind and unload. A Device End is presented when the unload is completed if the tape unit was in the ready state when the reset was issued.

Interface Disconnect

When an interface disconnect is issued by the channel the tape unit removes all information from the interface. If a command is in progress when the disconnect is issued, the tape unit presents the normal ending status for that command.

If a Read or Write-Backspace command is in progress, the tape unit treats the disconnect as a normal stop. It presents Channel End immediately and Device End when the terminating repositioning cycle has been completed. The repositioning logic is referenced to the next byte to be presented to the channel.

SYSTEM DATA FLOW AND LOGIC

The system of FIG. 1 is divided for convenience into an upper section designated "Transport Control logic" and a lower section designated "Data Control logic."

Figure 1A:
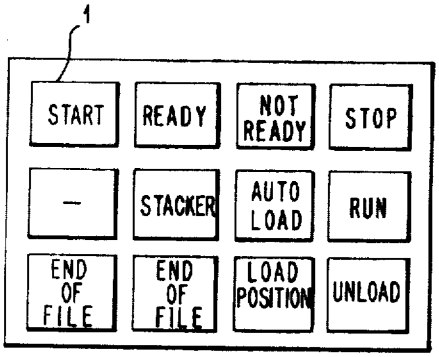
FIG. 1*a* represents a control panel with various buttons and indicators and situated on the tape transport unit of FIG. 1.

The Control Panel for the version having automatic cartridge loading, unloading and stacking facilities is shown in greater detail in FIG. 1*a*. Portions of this control panel are also valid for the manual load-unload version of the tape unit which is the one described in detail herein.

Controls and Indicators

The control panel for the automatic version includes the following control buttons and indicators.

Start Button

If a tape is loaded, the start button places the tape unit in a ready state under the following conditions:

a. The control unit is not communicating with the channel.
b. The control unit does not contain unaccepted status.
c. The tape is not moving.
d. Select Out is inactive.
e. The stacker is not full.
f. A cartridge is in the hopper, or the End of file indicator is on.

If a tape cartridge is not loaded, depressing Start causes a cartridge to be loaded if a cartridge is in the hopper and the stacker is not full. On being loaded, the tape unit enters the ready state if a cartridge is in the hopper or the End of file indicator is on, and the Stop key is not depressed during the loading of the cartridge.

The control unit must be in the ready state before any command other than Sense or Test I/O will be accepted. If the control unit is not in the ready state, Intervention Required is set (see Sense Bit 1).

Stop (Button)

The Stop button places the tape unit in a not-ready state under the following conditions:

a. The control unit is not communicating with the channel.
b. The control unit does not contain unaccepted status.
c. The tape is not moving.

If the above conditions are not met at the time Stop is depressed, the transition to the not-ready state takes place as soon as all of these conditions are satisfied.

If the Stop button is depressed during a Control-Rewind command-initiated rewind or unload, the changer stops in the discharge position.

Depressing stop during cartridge-loading prevents the tape unit from entering the ready state. If Stop is depressed while the tape unit is in a ready state, it enters the not-ready state after Device End is presented to the channel.

Depressing Stop turns off the End of file indicator.

Unload (Button)

Depressing the Unload button causes the tape to unload if the control unit is in the not-ready state. When the tape is unloaded, depressing the Unload switch causes the cartridge which is mounted to be ejected and the next cartridge to be mounted. The tape unit is not made ready as it is when the Load button is depressed.

End of File (Button)

The End of File button is depressed when the last stack of cartridges of a given file is positioned in the hopper. This causes the control unit to signal the channel when the end of the last tape in the stack is reached.

Ready (Indicator)

The Ready indicator lights when the control unit is in the ready state.

Not Ready (Indicator)

The Not Ready indicator lights when the control unit is in the not-ready state.

End of File (Indicator)

The End of File indicator lights when the End of File button is depressed. It remains on until the end of file is reached or until the Stop button is depressed.

Stacker Full (Indicator)
The indicator lights when the stacker is full.
Load Position (Indicator)
The Load Position indicator lights when a cartridge is loaded on the tape deck and no tape has been removed from the cartridge.
Run (Indicator)
The Run indicator lights when a command that causes tape movement is being executed.
Auto Load (Indicator)
The Auto Load indicator lights during a tape cartridge load or unload operation.

Reading of tape is initiated by depression of the Start button 1 associated with a control panel on the tape transport mechanism 2 through Start control 3 to the Processor Interface control 4. A command is issued from Processor Interface control to the Drive and Brake logic 5 which subsequently produces tape motion in the desired direction. As the tape is moved under the magnetic head 6, characters are sensed by the sense amplifiers 7 and loaded into a Buffer register 8 when Read Circuit 17 is strobed by feedback from the timing disc 9. Timing signals are derived by Photodetectors 12 and Strobe Logic 14. In some cases, the processor may not be able to service the tape unit at its free running rate, in which case both the Buffer and Data registers will be loaded with data and therefore will be unable to accommodate additional characters. In this case, an overrun situation is detected and a repositioning cycle is initiated to reposition the tape in order to reread a character that could not be accommodated in the Buffer register.

In the present system and in accordance with the present invention, means is provided to insure a high degree of accuracy and control during repositioning of the tape as well as during normal reading of the tape. Such means is generally shown in FIG. 1 as comprising a Direction Memory 13, a Direction Detection circuit 15, and a Character Position (Stop) counter 16. Means is provided to step the counter up (increment), or step it down (decrement).

The repositioning mechanisms and circuits described herein insure the highest degree of accuracy in locating the very next character that should be read from the tape.

In addition to the overrun situation detected by overrun circuit 18 that requires repositioning of the tape record media, such repositioning may be necessary under other circumstances such as detection of an error detected by circuit 19 or a change in commands received from the processor. As an example, the tape may be driving in a forward direction and the processor requires a reversal of tape drive in order to reread a particular block of information. Under such circumstances, the repositioning mechanisms and circuits are also effective to insure accurate determination of the next character to be read.

DETAILED HARDWARE AND LOGIC

Figure 2A:
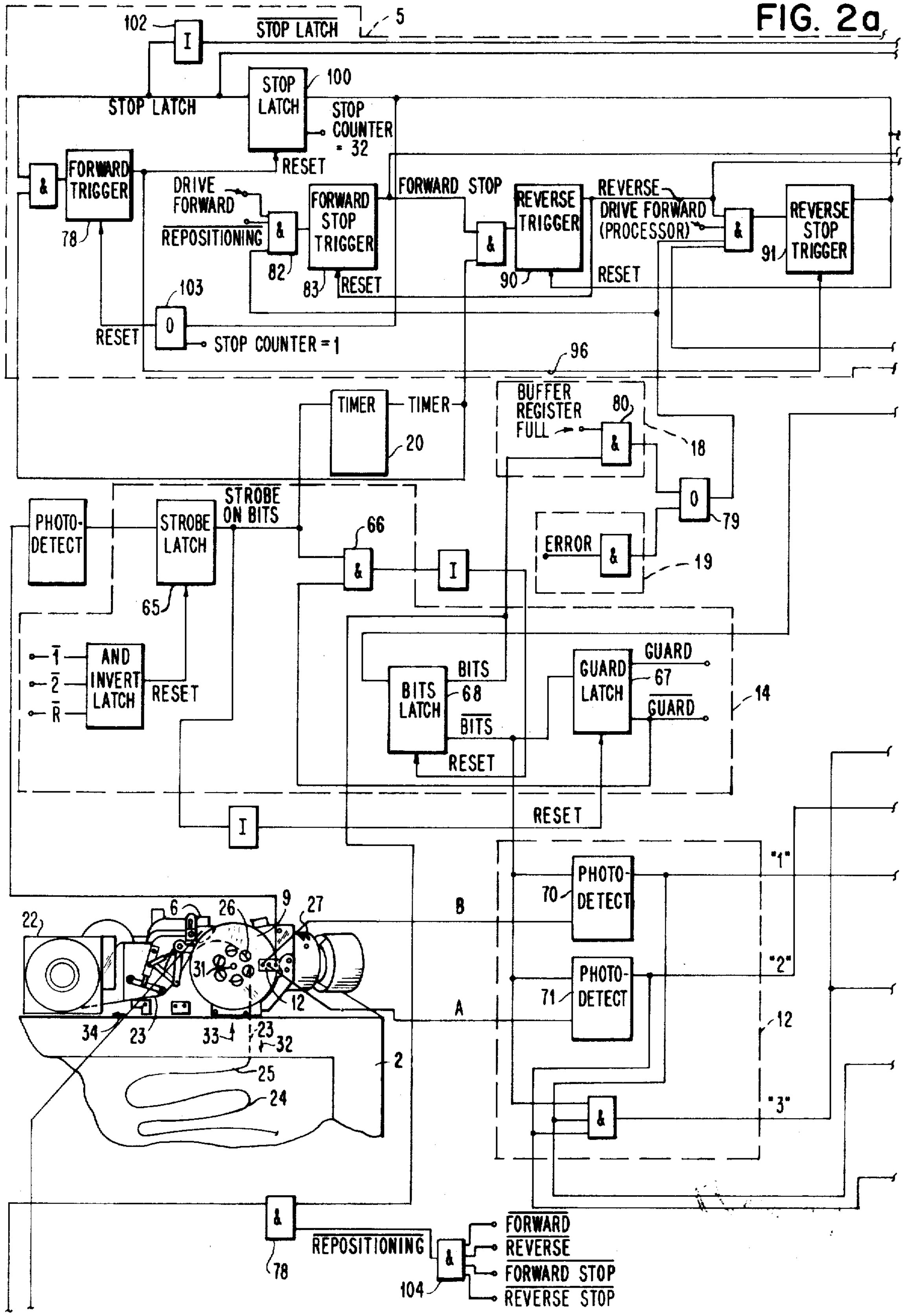
FIGS. 2*a*, 2*b*, and 2*c* when arranged as shown in FIG. 3 comprise detailed hardware, circuits, and logic for practicing the overrun detection, repositioning, and driving techniques according to the present invention, particularly emphasizing the characteristics of the tape unit in the system.
Figure 2B:
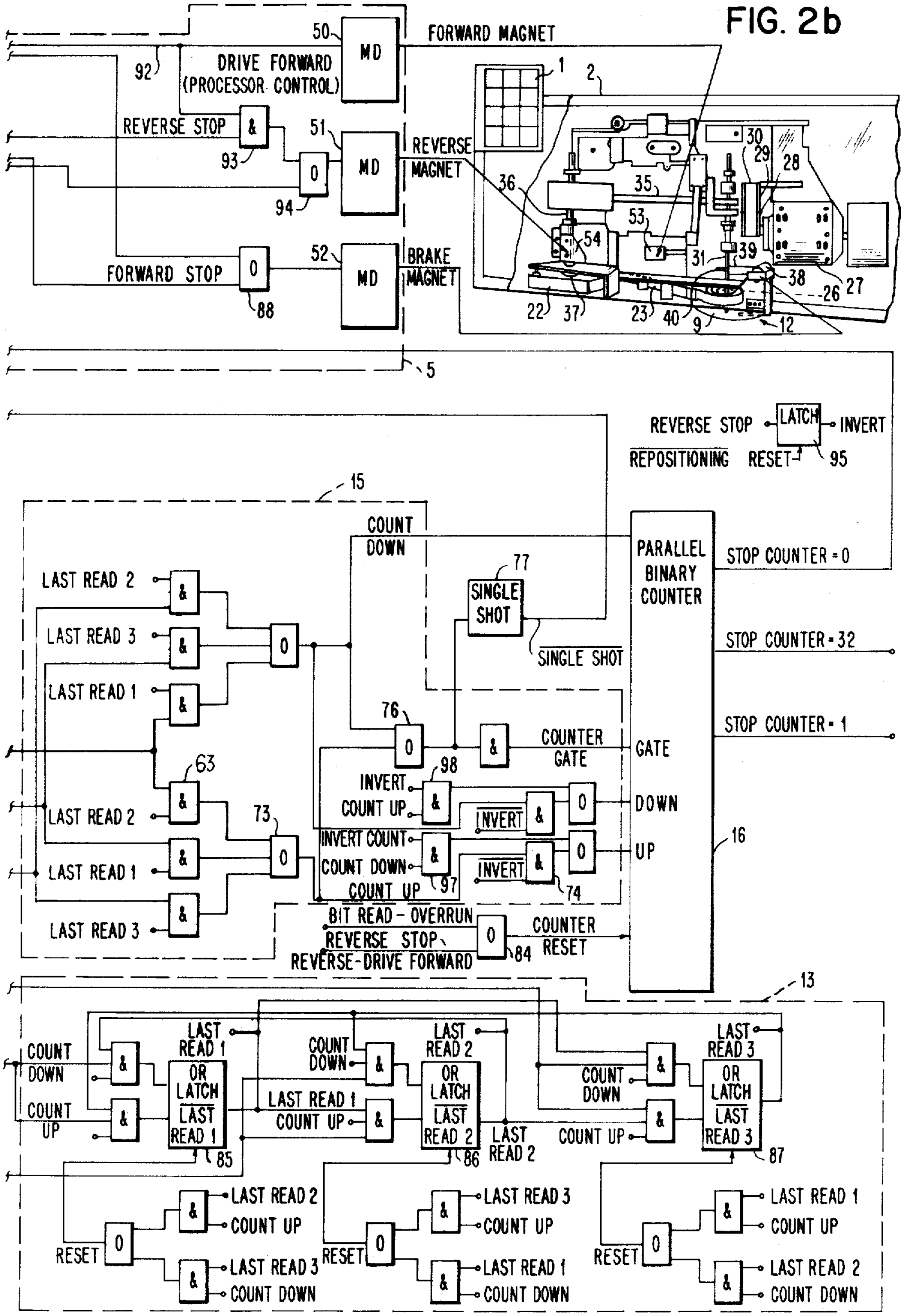
Figures 2C, 2D, 3:
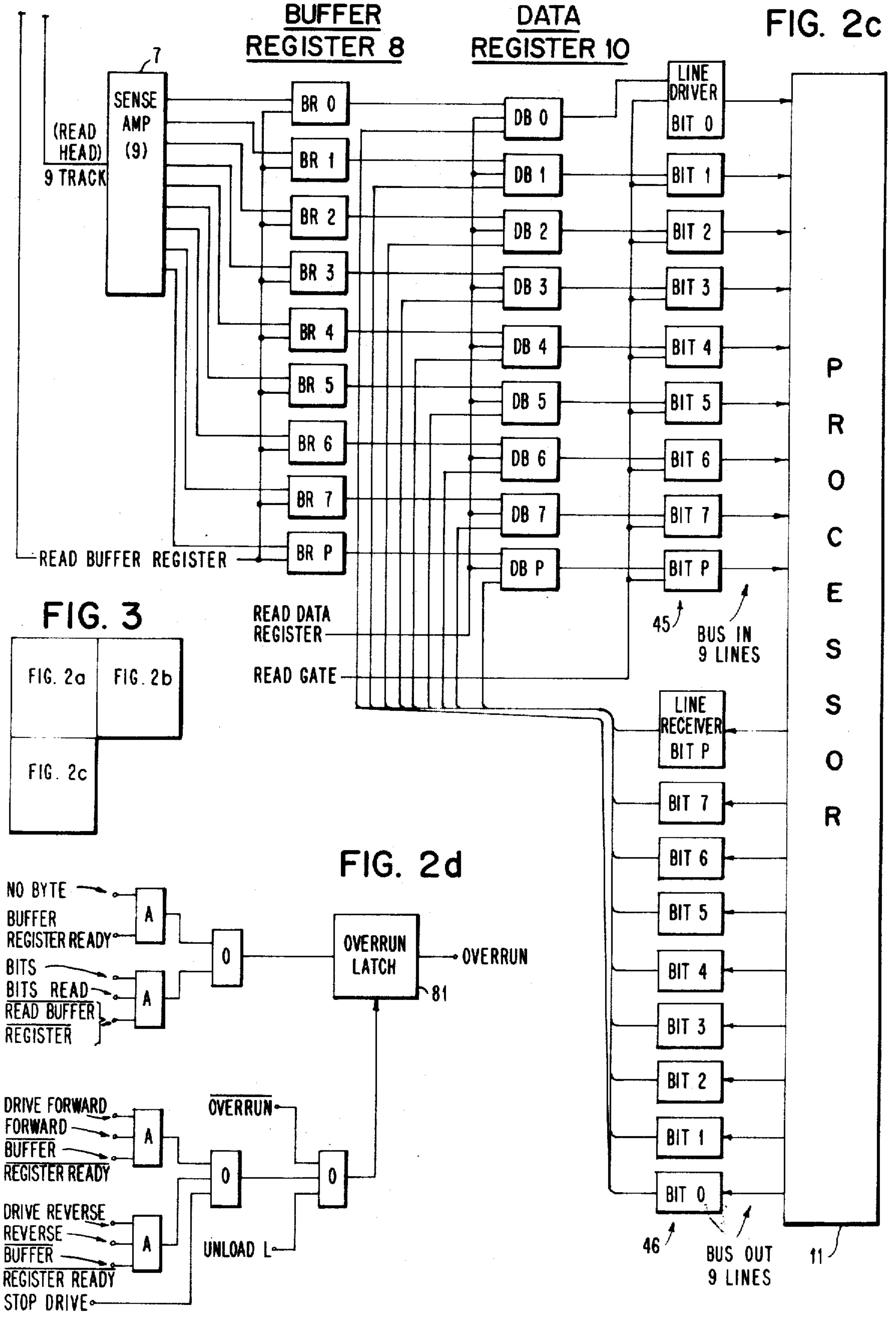
FIG. 2*d* illustrates an alternative overrun detection circuit for use in the circuitry of FIG. 2*a*.

FIGS. 2*a*—2*c*, when arranged as shown in FIG. 3, illustrate a more detailed arrangement of hardware and circuits for the system just discussed in connection with FIG. 1. Various logic shown in FIGS. 2*a*—2*c* is arranged in blocks that correspond with those shown in FIG. 1 and that are similarly designated.

As also shown in FIG. 1, the system of FIGS. 2*a*—2*c* includes a processor 11 that is interconnected with a magnetic tape record reading and transport unit having a side view illustrated in FIG. 2*a* and a top view illustrated in FIG. 2*b*. In this version, a single tape cartridge is manually positioned by an operator onto a cartridge hub. The tape unit has a leader that remains in the unit and that is positioned for connection with the end of the tape record media as described in the Sims' patent. Depression of the Start button on the unit, further conditioned by a command from processor 11, initiates feeding of the tape into the unit far enough for sensing of data signals on the tape by magnetic head assembly 6. The tape is fed into a bin where it assumes a loosely folded condition during operation.

Tape unit 2 accommodates tape cartridge 22 with magnetic tape 23. During a Load operation, tape 23 is pulled into the unit by leader 24 attached by clip 25. Tape 23 is driven forwardly by sprocket 26 from motor 27 through pulleys 28 and 29, belt 30, and forward drive shaft 31 in a direction indicated by arrow 32. During an Unload operation, tape 23 is rewound at relatively high speed into cartridge 22 in a direction indicated by arrows 33 and 34. The drive is from motor 27, shaft 35, rewind shaft 36, and drive hub 37. The rewind is essentially free-running until leader 24 is detected, at which time brake magnet 38 operates friction-shoe armature 39 against brake disc 40 on shaft 31 to apply bias on tape 23 through sprocket 26 and reduce tape speed to perhaps 50 percent of the nominal highest speed. Slotted disc 9 cooperating with photosensors 12, indicates speed of shaft 31, hence tape 23.

TAPE TRANSPORT MECHANISMS

Figure 4:
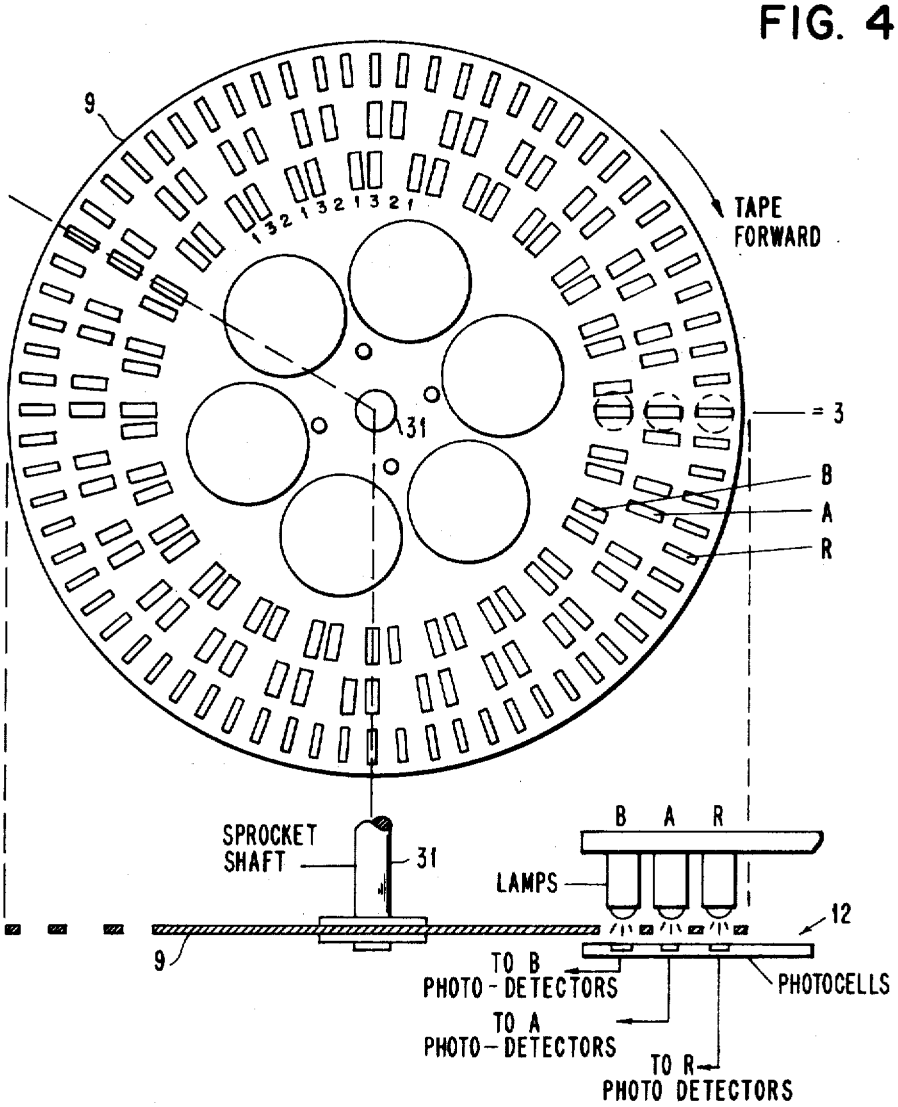
FIG. 4 represents a timing disc and associated photodetection elements for indicating both direction and extent of movement of a tape media in the tape transport mechanism of FIGS. 1 and 2*a*—2*c*.

FIGS. 4—8 illustrate various mechanisms incorporated in the tape unit that are concerned with the reading of the tape, the driving of the tape, and the tape to head registration. In FIG. 4, the slotted disc 9 used by the tape transport mechanism is illustrated. The disc has three slotted tracks, the outer track being a strobe slot designated R, the inner tracks being coded in binary and designated A and B. The slotted disc is directly coupled to the tape transport drive by shaft 31 and thus provides a means of detecting tape to head registration. The inner tracks of the disc, designated A and B and coded in binary, provide a means of detecting the direction of motion of the disc and the tape. The relationship of the slots and signals derived from sensing the slots is illustrated in FIG. 9. The use of the signals so derived will be discussed in detail in the later sections involving operation of the unit.

Figure 5:
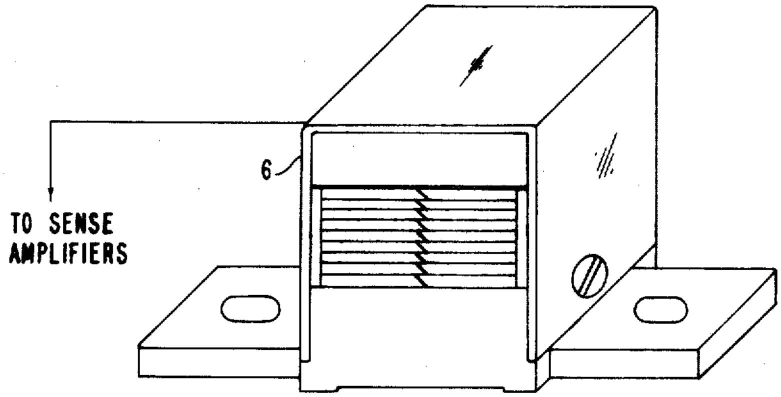
FIG. 5 represents a magnetic head configuration in the tape transport mechanism of FIGS. 1 and 2*a*—2*c*.

FIG. 5 illustrates a magnetic head configuration for the tape unit. Head 6 is incorporated in a housing for mounting in the tape unit and includes nine gaps oriented at a 45° angle for sensing of the data bits on the tape record media. As described in the Sims' patent, the recording of bits is at a 45° angle in the MT/ST which enables the sensing of bits transversely during normal reading operations as well as the sensing of a search bit longitudinally of the tape during a high speed search operation.

Figure 6:
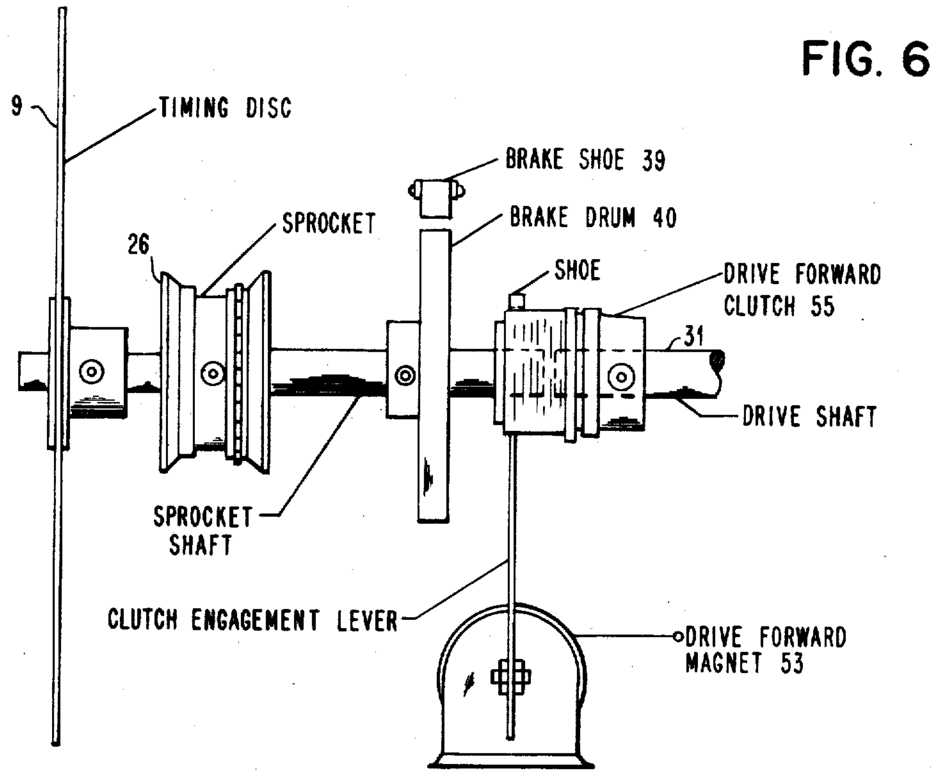
FIGS. 6, 7, and 8 represent various driving, clutching and braking mechanisms incorporated in the tape unit previously indicated diagrammatically in FIGS. 2*a* and 2*b* and intended to establish forward and reverse movement of a tape media, as well as clutching and braking as required.

FIG. 6 further illustrates some of the mechanisms in the tape unit including the timing disc just described. The timing disc 9 is coupled to drive shaft 31 that also mounts sprocket wheel 26 having sprockets positioned for engagement and driving of the tape record media. Associated with drive shaft 31 is a drive forward spring clutch 55 controlled by an engagement lever 55 operated by the drive forward magnet 53. In order to achieve rapid deceleration of the tape and drive mechanisms during repositioning particularly, drive shaft 31 also incorporates brake drum 40 that is engaged by a brake shoe 39 under appropriate circumstances to stop the drive.

Figure 7:
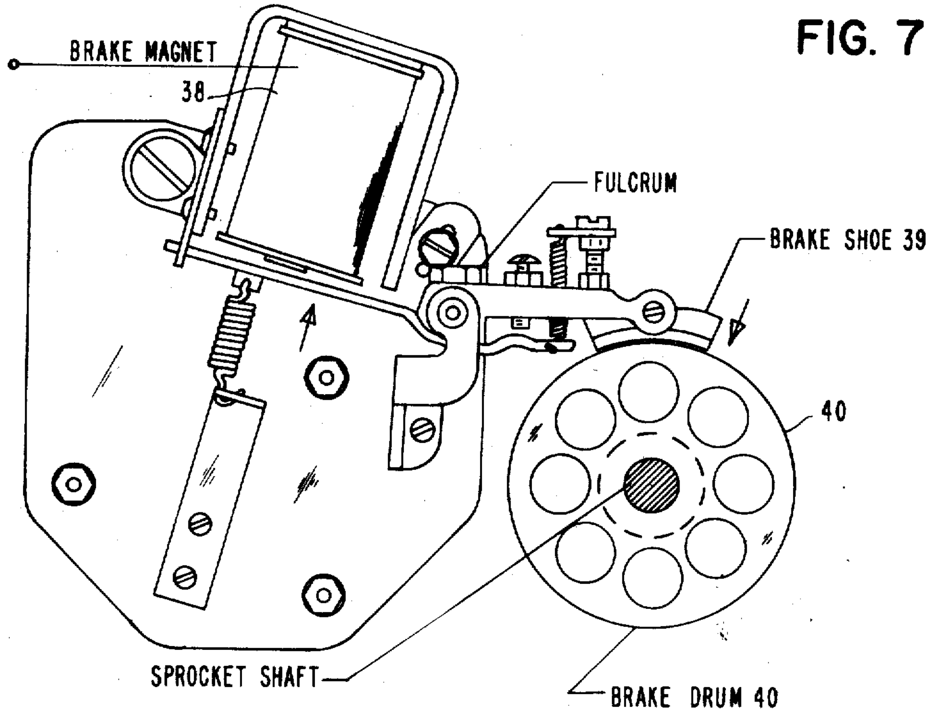

The brake mechanisms are more fully illustrated in FIG. 7. This shows the brake drum, the brake shoe, and various linkages arranged for operation by the brake magnet.

Figure 8:
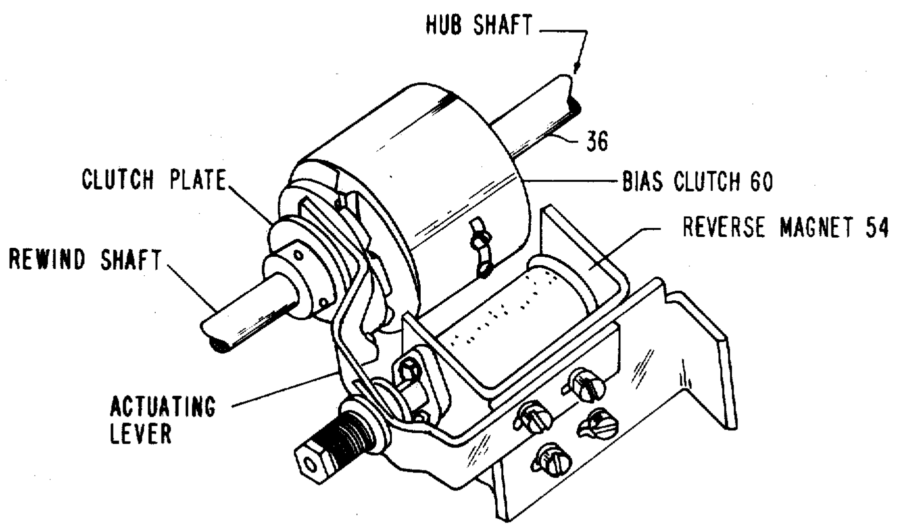
Figure 9:
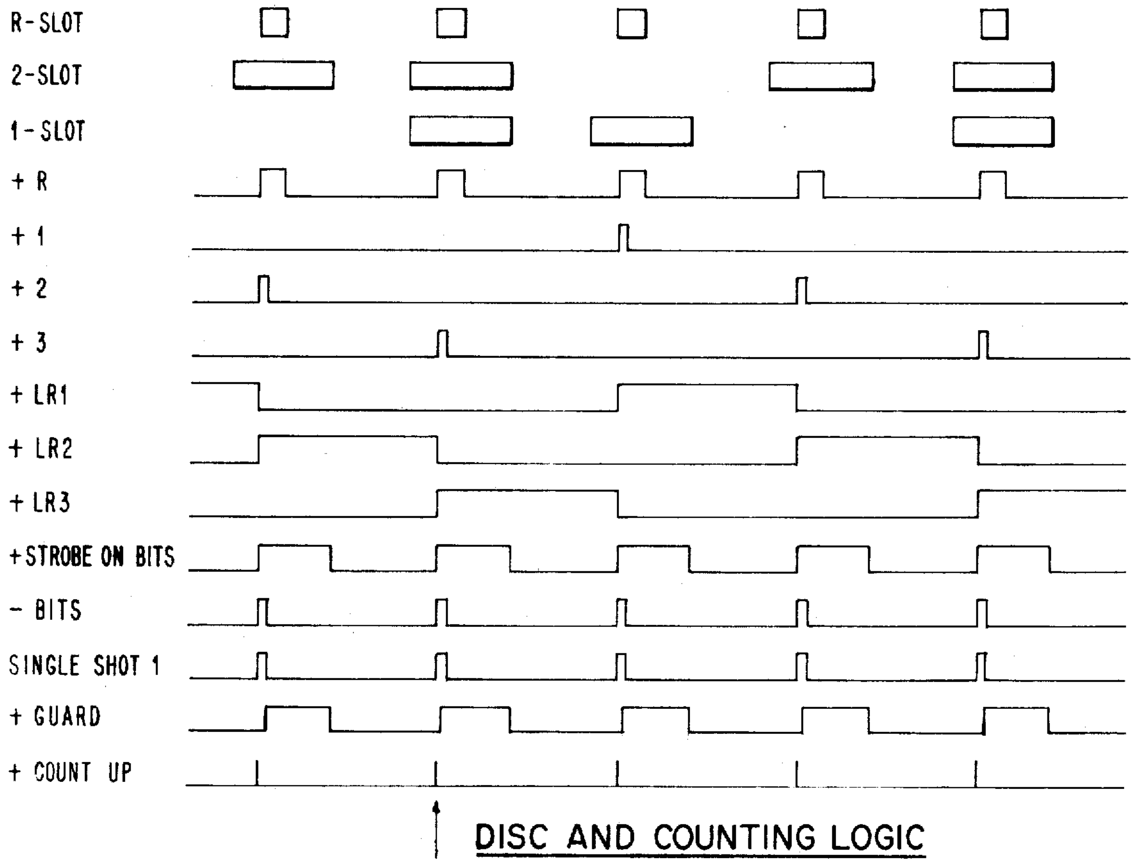
FIG. 9 illustrates timing considerations developed by sensing the apertures in the timing disc of FIG. 4.

FIG. 8 shows mechanisms involved in reverse drive of the tape media which is accomplished by driving the tape cartridge hub from the hub shaft through a dog clutch 60 operated by reverse magnet 54. Reference is made to the Sims' patent for comparable mechanisms.

The circuits in FIGS. 2*a*—2*c* will be described in greater detail in later sections of the present case concerning operation of the system but a number of items in the circuits are of interest at this time. In connection with the driving of the tape record media, the drive and brake logic circuits include magnet drivers (MD) 50—52 for energizing Forward magnet 53, Reverse magnet 54, and Brake magnet 38 is in the tape unit. An accurate determination of character locations is primarily under control of slotted disc 9 shown in greater detail in FIG. 4 and having associated photosensing devices 12. Throughout the processing of the tape in the tape unit, it is necessary that the tape be moved under some circumstances at high speeds in the forward and reverse direction, that changes in direction are effected efficiently and rapidly but in such a manner that tape breakage is avoided. The interval timer 20 in FIG. 2a cooperates with the photosensing elements 12 and disc 9 to provide an indication of tape velocity so that no change in direction can be initiated until the velocity is below a certain level. The counter 16 mentioned in connection with FIG. 1 is illustrated in FIG. 2b as a binary counter and has various associated logic in a Direction Detection circuit 15 and a Direction Memory 13 for controlling the incrementing and decrementing of the counter.

The output of counter 16 is used in connection with the photodetection logic to produce an accurate determination of character locations on tape.

During the movement of tape in the forward direction, characters, comprising nine bits each, are sensed by magnetic head 6 with the signals being shaped in sense amplifier circuits 7 and thereafter provided to Buffer register 8 which comprises a corresponding number of latches designated BR0—BR7 and a Parity latch BRP. Characters are subsequently transferred to Data register 10 that comprises nine latches designated DB0—DB7 and DBP (Parity). The bits are furnished to line drive circuits 45 designated Bit 0—Bit 7 and Bit P for transfer to the processor. The line receiver circuits 46 designated Bit 0—Bit 7 and Bit P receive characters from the processor that are subsequently decoded by the tape unit upon command of the processor for effecting various functions in the unit.

NORMAL DRIVE FORWARD (READ COMMAND), DATA TRANSFER, AND OVERRUN

The operation of the system will be described particularly in connection with several situations that may arise. The primary objective of the system described herein is to transfer characters of information from a tape record media to a data processor for appropriate storage, arithmetic operations, printout, and similar processing operations. As mentioned previously, the more detailed circuits of the present system are set forth in FIGS. 2a—2c. The operations will be described by reference to these FIGS. and by further reference to FIGS. 9—14 that illustrate some of the typical situations encountered as well as the various signals occurring during operation.

It is assumed that a tape cartridge has been loaded into position in the tape unit. The reading routine is conditioned by depression of the Start button. Thereafter, the tape unit awaits a Read command from the processor. When the command is received, the tape is drawn past the tape unit magnetic head 6 and data transfer begins. Characters are loaded into the Buffer register latches, transferred to the Data register latches, and to processor 11. As set forth in the Interface manual referred to previously, the processor may service the tape unit on a multiplex basis or on a burst basis. In the multiplex mode, the tape unit is one of a number of inputs to the processor and is serviced in a sequential manner along with the other units. In a burst mode, the processor accepts a continuous stream of data from the particular tape unit involved before servicing other units.

Accordingly, the characters are read in the tape unit, transferred into the Buffer register 8 and Data register 10 in sequence and then to the processor 11 in a normal reading operation. As indicated in the introductory portion, a number of situations may arise which require the tape unit to stop reading characters and to reposition the tape in readiness for reading at a later time. These situations include an overrun condition, a change in command from the processor, and an error condition. The first two conditions will be discussed in detail subsequently and the practice of the third condition, that is, the error recognition, will be apparent by consideration of the actions involved in the other situations.

All during the time that normal reading and data transfer is taking place between the tape unit and the processor, the photosensing circuit 12 responds to the emitter disc slots to derive various signals shown in FIG. 9 that are applied in the circuits in FIGS. 2a—2c to step the binary counter 16 in correspondence with the successive character locations on the tape. However, during this time, no particular use is made of the counter status and the outputs from the counter are essentially ignored.

FIG. 9 illustrates the slot relationships in the emitter disc and various signals that are useful in stepping the binary counter. The slots are designated R slot, A slot, and B slot. The slots in the emitter disc 9 are positioned in such a manner that a determination can readily be made as to the direction of rotation of the disc and consequently the direction of movement of the tape that is directly coupled with it. The R track on the disc provides a strobe signal for controlling character position counting. During a Read operation, the strobe signal is also used to find the place on tape where a character can be read.

The direction of tape movement is determined by detecting the sequence that the codes appear in the A slot and B slot tracks. For example, a sequence of 1, 2, 3, 1, 2, 3, 1, 2, 3... is construed as forward motion while 3, 2, 1, 3, 2, 1, 3, 2, 1... represents reverse motion of the tape. A one to one correspondence exists between the character position codes on the disc and the character positions on tape 23.

Referring to FIGS. 2a and 2b, the strobe output from the emitter disc is supplied by Strobe latch 65 on the line designated Strobe On Bits through an AND circuit 66 that is gated by Not Guard from Guard latch 67 to reset a Bits latch 68. The Not Bits output from the Bits Latch 68 is applied through two photodetection circuits 70 and 71 that are respectively gated by the individual 2 slot and 1 slot outputs from the emitter disc. Thus, the +1, +2, and +3 signals shown in FIG. 9 are generated.

As the slots in the emitter disc are sensed by the circuits just described, the signals developed are also applied to the various logic in Direction Memory 13 which keeps track of the direction in which the disc and consequently tape 23 is moving. Direction Memory 13 is shown particularly in FIG. 2b. The purpose of the Direction memory is to determine in which direction to step counter 16 so that the counter can be incremented in one direction or decremented independently of the direction of rotation of the disc and the direction of movement of the tape. The Direction Memory includes three OR latches 85, 86, and 87 that are conditioned by various associated logic to store the disc 9 combination last read. Latches 85, 86, and 87 provide Last Read 1, Last Read 2, and Last Read 3 indications, respectively. As an example, if the Direction Memory determines that it last read a 1 as reflected by the Last Read 1 latch output and a 2 signal has just been received, And circuit 63 is conditioned and the OR (0) circuit 73 output together with Not Invert will gate AND circuit 74 to provide a Count Up signal to the binary counter 16, thereby incrementing the counter. A Count Down situation is determined in a similar fashion. In either event, the output of OR circuit 76 fires a Single Shot 77 which is connected to the Bits Latch 68 to return it to the On status. This determines the interval of "Not Bits." The signal "Bits" is applied with a Not Repositioning signal through AND circuit 78 in FIG. 2a to gate data from the Sense amplifier circuits 7 into the several latches of the Buffer register 8. If the Data register is empty at this time, a +Read Data Register signal is shortly made available to further gate the data from the Buffer register 8 to the Data register 10. This can take place immediately if the Data register is empty or at any time that the Data register becomes available. Subsequently, a +Read Gate signal is used to transfer the character information from the Data register to the Line Driver circuits 45 and thence to processor 11.

Figure 10:
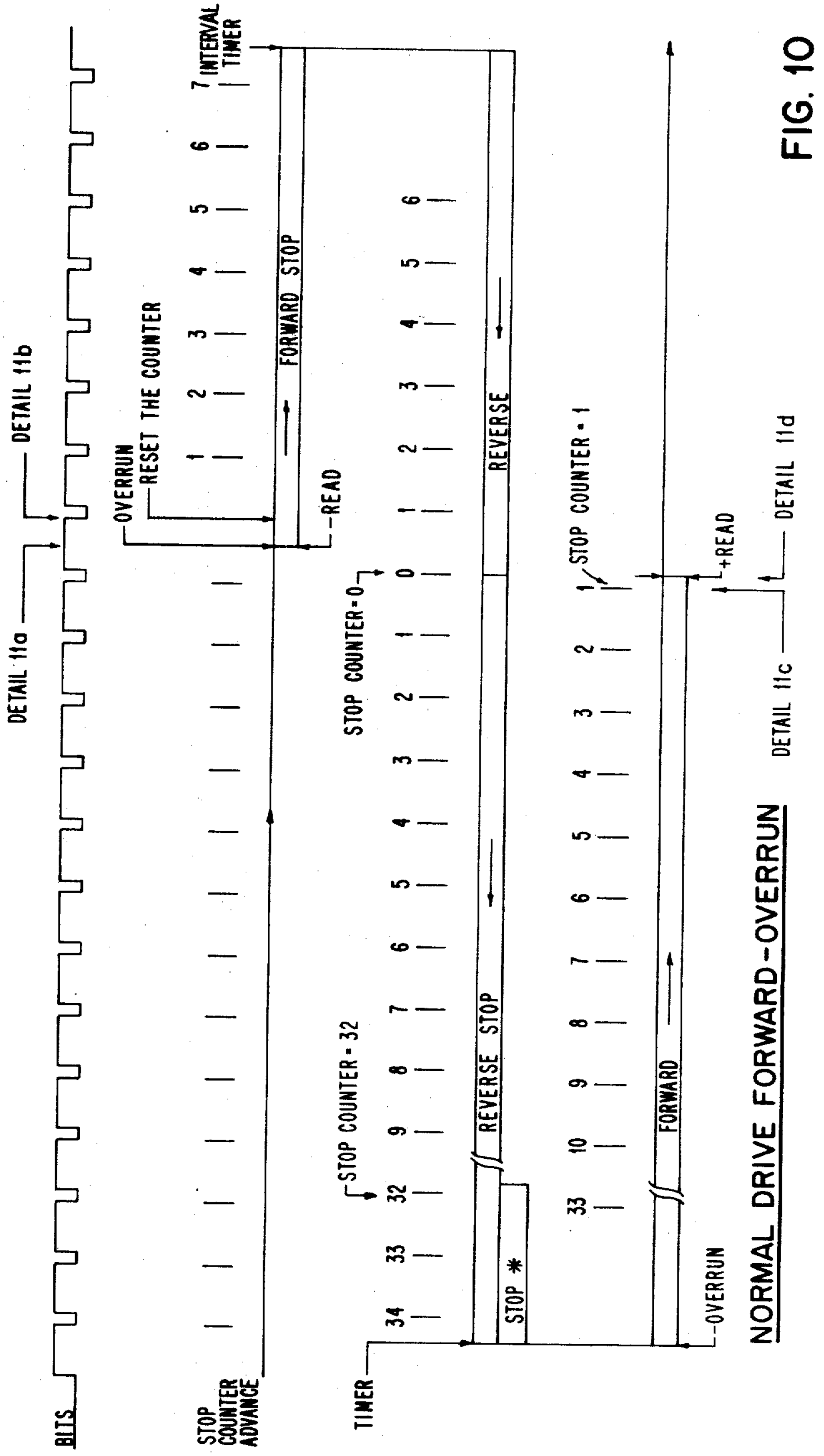
FIG. 10 illustrates a normal Drive Forward (read command) situation wherein an overrun condition is recognized and repositioning of the tape media effected.

Frequently, during the course of transfer of data from the tape unit to the processor, conditions arise that prevent the transfer of information from the data register over to the processor. In such event, an overrun condition prevails and it is then necessary to stop reading of the tape record media, reposition the tape sufficiently from the character that should be read next in order that the tape can be up to proper speed and to thereafter initiate reading and transfer operations in a normal fashion. FIG. 10 illustrates a normal drive forward and reading operation during which an overrun condition is encountered. Several detailed waveform charts are shown in FIGS. 11a, 11b, 11c, and 11d that are related to the overrun situation illustrated in FIG. 10. As a result of the Data register 10 being made unable to transfer its data, Buffer register 8 is correspondingly unable to transfer its data. The fact that the Buffer Register still has data in it is indicated by a Buffer Register Full signal to AND (8) circuit 80 in the overrun circuit 18 shown in FIG. 2a.

As an alternative, the circuit of FIG. 2d can be used to condition or reset the Overrun operation. This circuit includes overrun latch 81.

Set Overrun Latch 81

A. Bits—Bit time

Bits Read—Bits have been read

Not Read Buffer Register—Buffer Register Not available.

B. No Byte—A zero byte has been read from tape

Buffer Register Ready—Data is in Buffer Register

Reset Overrun Latch 81

A. Drive Forward—Read Command

Forward—Forward Direction

Not Buffer Register Ready—Processor has just initiated data transfer and Buffer Register is empty.

B. Drive Reverse—Write-Backspace

Reverse—Reverse Direction

Not Buffer Register Ready—Processor has just initiated data transfer and Buffer Register is empty.

C. Stop Drive—Set by end of Read or Write-Backspace Command or Unload Latch set.

With the circuit of FIG. 2d in any given cycle when buffer register is full and an overrun seems imminent, it may still be avoided if data is actually transferred out of the Buffer register to the Data register in the cycle prior to setting of the Overrun latch in that same cycle.

Returning to the simpler overrun circuit of FIG. 2a, the overrun signal is directed from OR (0) circuit 79 to And circuit 82, together with a Not Repositioning signal and a Drive Forward signal to set the Forward Stop trigger 83. At this time, a Bit Read signal plus Overrun signal are applied through OR circuit 84 in FIG. 2b to reset binary counter 16.

Figures 11, 11A, 11B, 11C, 11D:
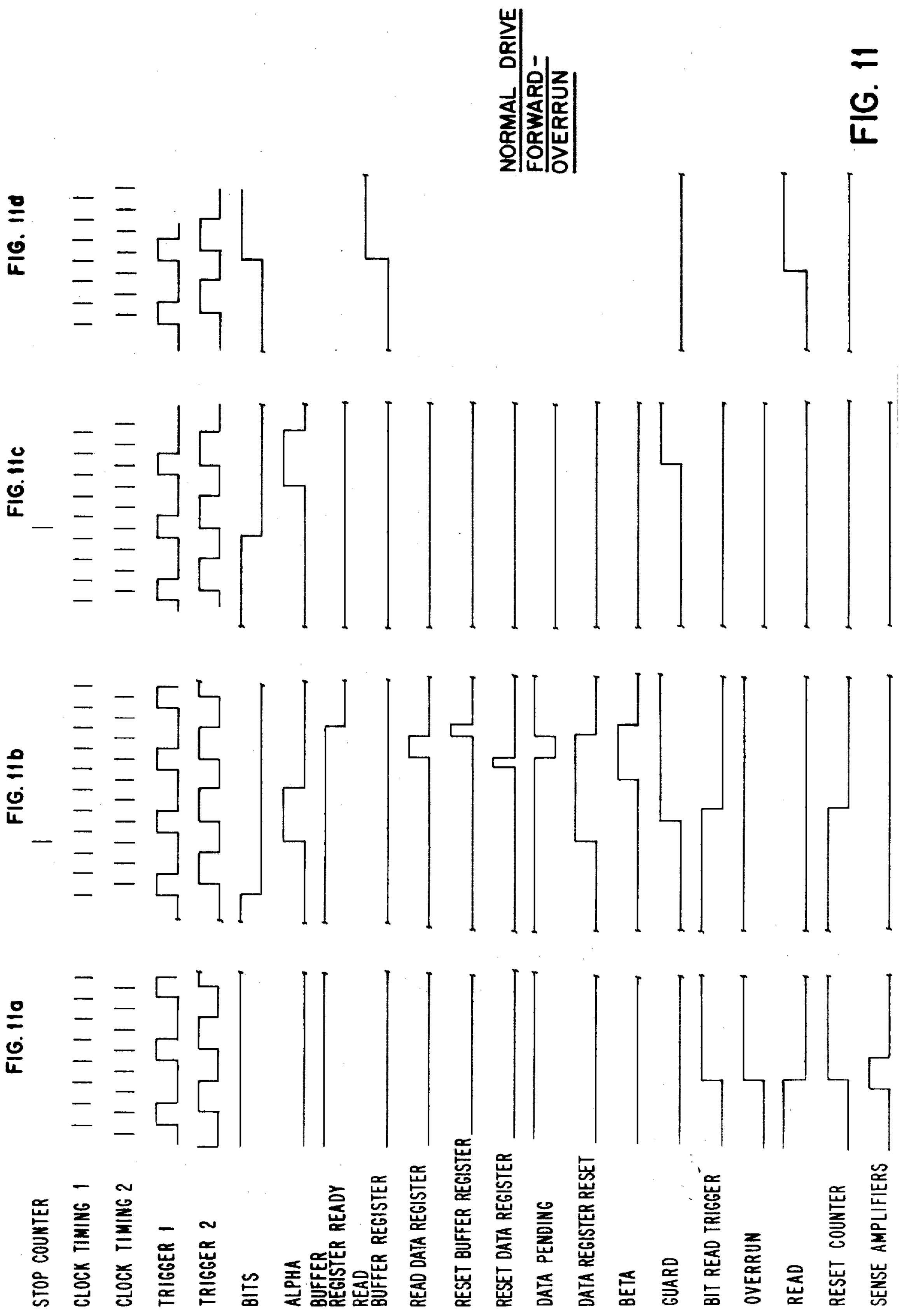
FIGS. 11*a*—11*d* illustrates detailed signal levels and wave forms developed at selected times indicated in FIG. 10.

The Reset Counter signal is held up all during the character interval in which overrun occurred to thereby prevent incrementing of the counter during this time. As will be evident later, this insures that the counter will have a status of 1 when the overrun character is encountered in the forward direction. This is used subsequently when the reading operation is resumed to insure that the character being read when the overrun occurred can be read again and transferred to Buffer register 8. FIG. 11b illustrates various signal conditions near the termination of the Reset Counter signal. The relationship of the signals developed in FIG. 11b enables the transfer of information to continue to processor 11 from the tape unit even after an overrun condition is sensed.

In FIG. 11a, the output of the sense amplifier indicative of a character having been read is ANDed with the Bits signal to set a Bit Read latch, not shown. Counter 16 is in a zero status at this time. The Forward Stop signal is applied in FIG. 2b by way of OR (0) circuit 88 to gate magnet driver 52 for energizing brake magnet 38 in order to stop the tape motion in the forward direction. During the deceleration period, the counter is incremented once for each character position on tape. This may be a variable number depending upon how long it takes to decelerate the tape. The incrementing of the counter is accomplished through the same circuits that were previously discussed in connection with FIGS. 2a and 2b and FIG. 9.

In FIG. 2a, the Strobe On Bits signal is applied to Timer circuit 20 which determines when the tape motion has been reduced sufficiently enough to enable an initiation of a reversal of tape motion. So long as the Strobe on Bits signals occur in a rapid fashion, the timer is unable to time out. A point is reached, however, when the bits will occur further and further apart and the timer is then able to time out and provide an input which, together with the Forward Stop signal, sets the Reverse trigger 90 on. The Reverse trigger output thereupon resets the Forward Stop trigger 83. The resetting of the Forward Stop trigger drops the gating signal into the brake magnet driver, deenergizing brake magnet 38. The Reverse trigger output is also directed to gate magnet driver circuit 51 for energizing the Reverse magnet 54 in the tape unit.

As the tape is moved in the reverse direction, the signals from the emitter disc 9 are developed in the manner previously described and are used to decrement the counter to zero. It is necessary during the repositioning procedures to establish an acceleration zone upon the tape to insure that when the tape is restarted in the forward direction that sufficient time is allowed for the tape to get up to speed for proper sensing of the data bits on the tape.

In FIG. 2b, the signals Stop Counter Equal Zero, Reverse, Drive Forward, and Overrun are sued to set the Reverse Stop trigger 91. The Reverse Stop signal is applied to reset the Reverse trigger 90. The Not Stop latch signal on line 92 and Reverse Stop in FIG. 2b through AND circuit 93 and OR circuit 94 in FIG. 2c continues to energize the Reverse magnet even though the Reverse trigger input has dropped.

In the present system, the intervals established to insure that the tape gets up to proper speed for sensing of data bits is predicated upon a count of at least 32 in the binary counter. That is, the tape continues to run in the reverse direction until counter 16 reaches a count of at least 32.

The Reverse Stop signal is also applied to latch 95 shown in FIG. 2b and is used to develop an Invert signal for reversing the direction of counting of the binary counter at the point that the counter reaches a status of zero. The Invert signal is applied with a Count Down signal through AND circuit 97 in FIG. 2c to initiate counting in the upward direction, that is, incrementing of the counter. The same principle applies when the direction of tape motion is changed from the Reverse direction to the Forward direction near the latter part of the repositioning operation in FIG. 10 since a change in the direction of counting of the counter is also necessary. At this time, the Invert signal, combined with the Count Up signal is applied through AND circuit 98 to initiate counting in the downward direction or decrementing of the counter during forward movement of the tape. Finally, when the Not Repositioning signal comes up, the Invert latch is reset in readiness for another repositioning operation.

When counter 16 reaches a count of 32, the Reverse Stop signal, together with the Count Equal 32 signal set the Stop latch 100 and subsequently through OR circuit 88 in FIG. 2b gate the magnet driver 52 for energizing the brake magnet. The Not Stop latch signal also drops, deenergizing the Reverse magnet driver 51 in FIG. 2b. The tape then begins to slow down, the timer circuit becomes effective to time the emitter disc impulses and the timer output in connection with the Stop Latch output sets the Forward trigger 78, FIG. 2a, to initiate a driving of the tape in the forward direction as shown in FIG. 10. The output of the Forward trigger is used to reset the Reverse Stop trigger by line 96. The Forward trigger output also resets the Stop latch. Inverter 102 provides a Not Stop latch signal and this, in connection with the Drive Forward Command condition established by the processor gates the Forward magnet driver 50 to energize the Forward magnet 53 and initiate movement of the tape in the forward direction. Also, the brake magnet is deenergized at this time. Accordingly, the outputs of the emitter disc are directed again to the counter to decrement it to a count of 1. The waveforms developed at this time are shown in FIG. 11c. As shown, the Guard signal going to the Up level prepares the system to read the very next character encountered on the tape. Also, reference is made to the waveforms in FIG. 11d. Only the waveforms of particular significance at this time are shown in FIG. 11d. The Stop Counter Equal 1 signal is used to reset the Forward trigger through OR circuit 103.

The resetting of the Forward trigger, together with Not Reverse, Not Forward Stop, and Not Reverse Stop are recognized by AND circuit 104 in the lower section of FIG. 2*a* to develop the Not Repositioning signal. This, ANDed with the Bits signal to AND circuit 78 enables the Read Buffer Register gating signal to transfer data sensed into the Buffer Register. This data will correspond to the exact character being read when the overrun condition occurred.

DRIVE FORWARD COMMAND FOLLOWED BY ANOTHER DRIVE FORWARD COMMAND

Figure 12:
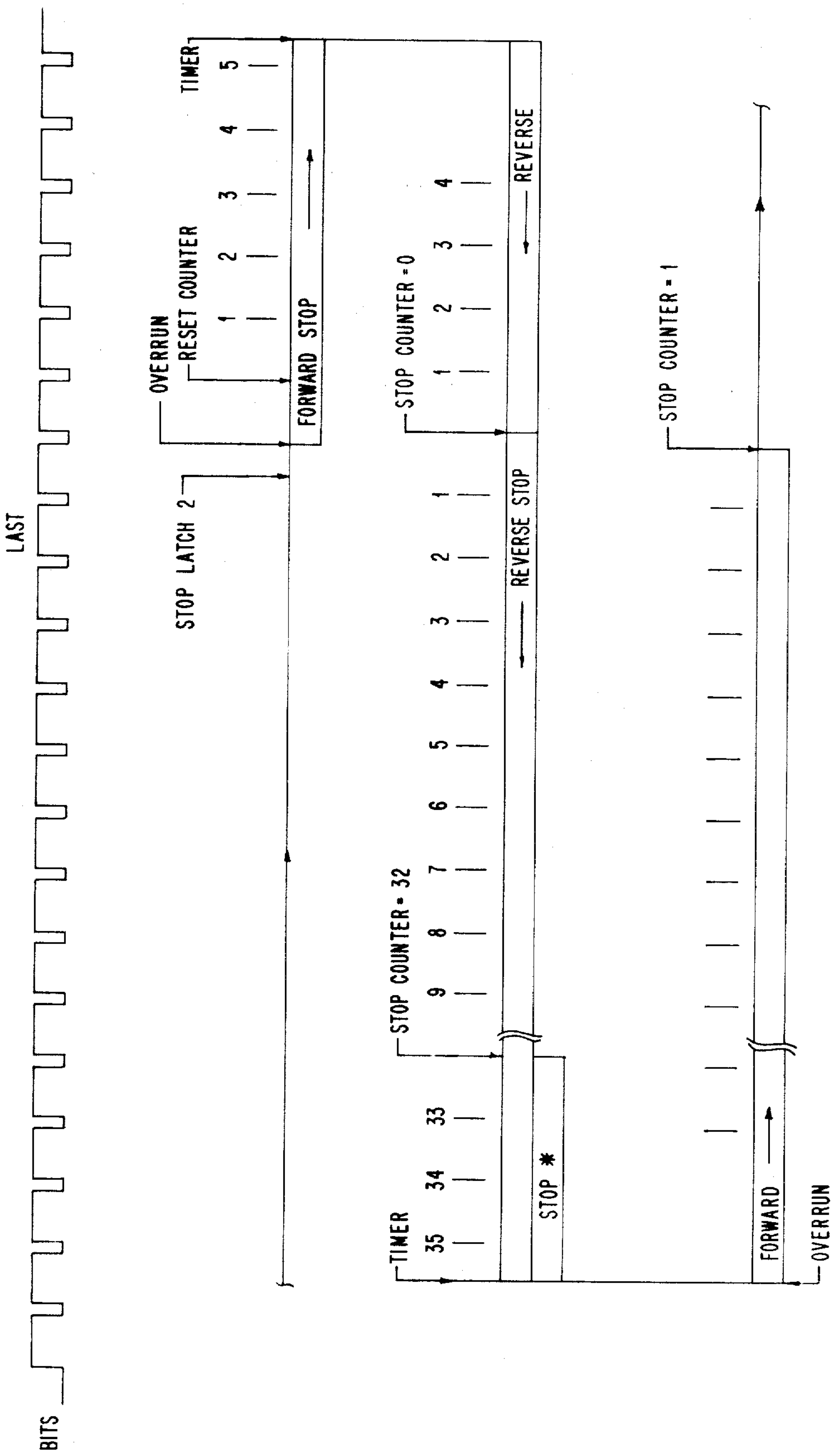
FIG. 12 illustrates operation of the tape unit when performing a Drive Forward operation followed by a Drive Forward operation.

FIG. 12 illustrates the operation of the system, particularly the tape unit when the processor issues a Drive Forward command, accepts only one character, and then issues another Drive Forward command immediately thereafter. This could result in an incremental kind of reading of the characters on the tape and requires repositioning of the tape each and every time that it occurs.

The procedure followed by the processor is to issue a Drive Forward command and then immediately follow this with a signal to set a Stop Latch 2 which thereupon initiates a repositioning operation as shown in FIG. 12 in a manner that is practically identical to the repositioning operation followed when the Overrun condition was recognized. In this way, the computer can derive the characters of information from the tape unit on a character-by-character basis. Essentially, the processor is thereby forcing an Overrun condition.

DRIVE FORWARD COMMAND FOLLOWED BY A DRIVE REVERSE COMMAND

Figure 13:
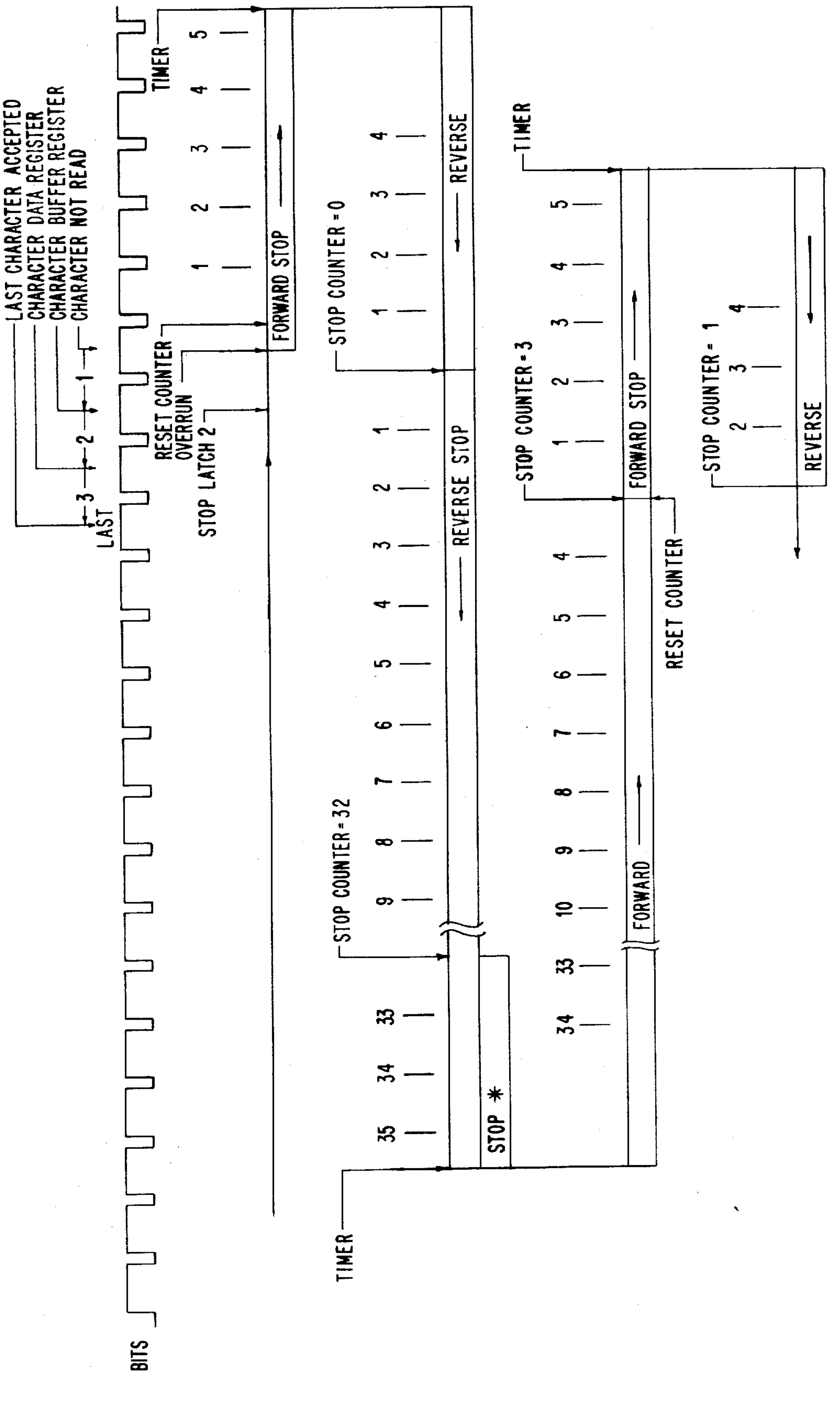
FIG. 13 illustrates operation of the tape unit when a Drive Forward command is followed by a Drive Reverse (Write-Backspace) command.

FIG. 13 illustrates the repositioning sequence involved when a Drive Forward command is issued by the processor and is followed either immediately or sometime later by a Drive Reverse command. This situation differs from the Overrun situation described in the connection with FIG. 10 in that the system, and particularly the counter must be referenced to the last character accepted by the processor rather than the overrun character as in an overrun situation. Reference is made to the 360 Manual previously referred to for various kinds of data transfer situations encountered in such systems. The situation illustrated in FIG. 13 corresponds to a Drive Forward command followed by a Write-Backspace command in the 360 system. Under such circumstances, neither the overrun character nor the character in the buffer register nor the character in the data register has been accepted by the computer, but the computer now wishes to go back into a previously transmitted block of characters in order to reread such blocks, as for example, when an error has been detected. It is assumed that the tape unit has been issued a Drive Forward command by the processor initially which has resulted in the reading and transfer of characters in the usual manner. However, upon sensing an error, the processor issues the Drive Reverse or Writer-Backspace command and furnishes a character on the bus out lines in FIG. 2*c* which causes the tape unit to perform a pseudowrite cycle. Accordingly, for each character presented by the processor ostensibly to be "written" by the tape unit, the tape unit actually reads another character position from the emitter disc and indicates to the processor that it has completed the "write" operation.

Referring again to FIG. 13, the operation of the tape unit proceeds as for a normal overrun condition with the counter decrementing to zero and then incrementing up to at least a count of 32 in the reverse direction. However, the tape unit stops at some point such as illustrated at a count of 35 and waits for the issuance of a command from the processor.

As soon as a Write Backspace command is received from the processor, the tape movement is initiated in the forward direction and counter 16 decrements in the usual fashion. In this case, however, the counter is reset at a count of 3, rather than at a count of 1, in order to rereference to the last character that was actually transferred to the processor. This is due to the fact that two characters are stored in the Buffer register and the Data register, respectively, that were not accepted by the processor. The purpose of the counting procedure is to insure exact synchronism between the physical character location on the tape and the block-character count being maintained by processor 11. When it is reset, the counter thereupon increments during the Forward Stop interval and decrements during the Reverse interval. This count resetting and counting procedure establishes a count of 1 in the counter when the last character transferred to the processor is about to be sensed by the tape unit. Thereafter, the tape unit can be incremented or a continuous reverse drive can be initiated with the characters on the tape being processed in an accurate manner. The procedures just described insure that the tape unit is able to accurately relocate the beginning of the block of information that was previously transferred to the processor.

As will be apparent, the techniques developed in connection with FIG. 13 can also be applied if it is desired to issue a Write-Backspace command followed by a Drive Forward command rather than the sequence of commands illustrated in FIG. 13.

NORMAL DRIVE REVERSE (WRITE-BACKSPACE) WITH OVERRUN

Figure 14:
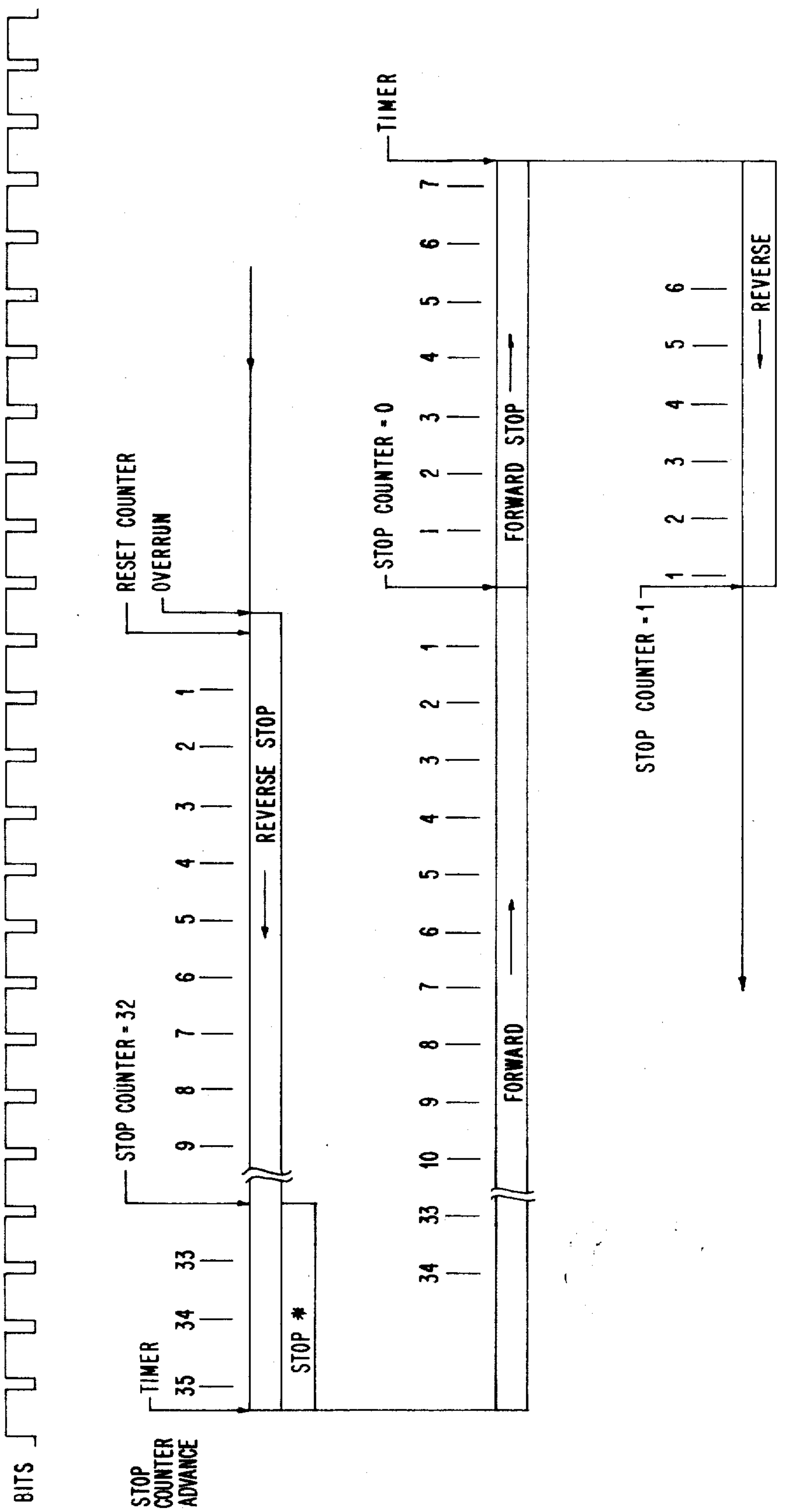
FIG. 14 shows action of the tape unit when an overrun condition is detected during a normal Drive Reverse (Write-Backspace) operation.

FIG. 14 illustrates the procedures followed when the tape unit is sensing character positions in the reverse direction. This is a pseudowrite situation since the characters are not actually gated to the registers as they are during a normal Drive Forward reading operation. The repositioning procedures illustrated in FIG. 14 occur if the processor does not service the tape unit fast enough to insure free running condition. This will lead the tape unit to an artificial overrun condition whereupon the tape is repositioned in readiness for further commands from the processor.

The handling of overrun in the reverse direction is similar to that during overrun in the forward direction as described in connection with FIG. 10. The system described is not limited to forward reading but may be logically implemented to reading in reverse, if so desired.

INHERENT ACCURACY OF POSITION REGISTRATION SYSTEM

It is evident from the foregoing discussion that the system disclosed herein provides an inherent accuracy of registration of the tape record media in relation to the character positions on tape. Reference is again made to FIG. 9 which illustrates the various emitter disc slots and the signals derived therefrom and to the discussion earlier in the present case concerning the detection of tape motion in the forward and reverse direction. The counter logic described herein provides an optimum degree of accuracy since any vibrations or oscillations encountered in the mechanical system are always reflected by appropriate incrementing or decrementing of the counter and therefore the counter will always accurately represent the exact character position on the tape. Therefore, within the limits of the counter, locations of the tape on either side of the read gap is always known. Using the counter control system described, the system accommodates overrun conditions and further repositions the tape to a desired extent in order to allow a sufficient time for tape acceleration and to insure that a minimum read velocity is established.

While the invention has been particularly shown and described with reference to several embodiments, it will be understood by those skilled in the art that various changes in form and detail may be made without departing from the spirit and scope of the invention.

We claim:

1. A method for referencing a media location on a media having a plurality of discrete locations, comprising the steps of:

A. relatively moving said media and a scanning means in order to scan locations on said media in a first direction during a transducing operation;

B. terminating the transducing operation at one of said locations;

C. decelerating and terminating relative movement of said media and said scanning means at a location beyond said one location;

D. relatively moving said media and said scanning means to scan locations on said media in the opposite direction at least a predetermined number of locations past said one location to establish an acceleration zone;

E. decelerating and terminating said opposite relative movement of said media and said scanning means; and F. referencing said one location by:

1. forwardly counting media locations encountered in step C beyond said one location prior to termination of scanning of said media in said first direction; and
2. reversely counting media locations encountered up to said one location in step D during scanning of said media in the opposite direction; and the number of locations encountered past said one location including at least said predetermined number of locations and any additional locations encountered prior to deceleration and termination of opposite relative movement in step E.

2. The method of claim 1, wherein:

the relative movements, deceleration and acceleration of said media are performed in a media transport unit interconnected with a data processor, and wherein initiation of relative movement to scan said media in said first direction during a transducing operation at step A and termination of the transducing operation at step B occur in response to commands emanating from said processor.

3. The method of claim 1, further comprising the steps of:

G. accelerating and relatively moving said media and said scanning means to again scan said media in said first direction;

H. counting media locations encountered up to said one location; and

I. recognizing a preselected count status indicative of reaching said one location to initiate a transducing operation with respect to said one location and subsequent locations.

4. The method of claim 3, wherein:

the relative movements, deceleration and acceleration of said media are performed in a media transport unit interconnected with a data processor, and wherein initiation of relative movement to scan said media during a transducing operation in said first direction at steps A and G and termination of the transducing operation at step B occur in response to commands emanating from said processor.

5. A method for referencing a character location on a tape record media having a plurality of discrete locations, comprising the steps of:

A. relatively moving said tape record media and a scanning means to scan character locations on said media in a first direction during a transducing operation;

B. terminating the transducing operation at one of said character locations;

C. decelerating and terminating relative movement of said tape record media and said scanning means at a character location beyond said one character location;

D. relatively moving said tape record media and said scanning means to scan locations on said media in the opposite direction at least a predetermine number of character locations past said one character location to establish an acceleration zone;

E. decelerating and terminating said opposite relative movement of said tape record media and said scanning means; and F. referencing said one character location by:

1. forwardly counting character locations encountered in step C beyond said one character location prior to termination of scanning of said media in said first direction;
2. reversely counting character locations encountered up to said one character location in step D during scanning of said media in the opposite direction; and
3. forwardly counting the number of character locations encountered past said one character location during scanning of said media in the opposite direction including at least said predetermined number of character locations and any additional locations encountered prior to deceleration and termination of opposite relative movement in step E.

6. The method of claim 5 further comprising the steps of:

G. accelerating and relatively moving said tape record media and said scanning means to again scan said media in said first direction;

H. reversely counting character locations encountered up to said one character location; and I. recognizing a preselected count status indicative of reaching said one character location to initiate a transducing operation with respect to said one character location and subsequent character locations.

7. A method for referencing a character location on a tape record media having a plurality of discrete locations and mounted for driving and scanning movement in a tape unit interconnected with a central processor, comprising the steps of:

A. issuing a first command from said processor;

B. responding to said first command to establish a reading operation by relatively moving said tape record media and a scanning means to read character locations on said media in a first direction;

C. providing characters as they are read to said processor;

D. terminating the reading operation at one of said character locations in response to a status condition;

E. decelerating and terminating relative movement of said tape record media and said scanning means at a character location beyond said one character location;

F. relatively moving said tape record media and said scanning means to scan locations on said media in the opposite direction at least a predetermined number of character locations past said one character location to establish an acceleration zone;

G. decelerating and terminating said opposite relative movement of said tape record media and said scanning means; and H. referencing said one character location by:

1. forwardly counting character locations encountered in step E beyond said one character location prior to termination of scanning of said media in said first direction;
2. reversely counting character locations encountered up to said one character location in step F during scanning of said media in the opposite direction; and
3. forwardly counting the number of character locations encountered past said one character location during scanning of said media in the opposite direction including at least said predetermined number of character locations and any additional locations encountered prior to deceleration and termination of opposite relative movement in step G.

8. The method of claim 7, further comprising the steps of:

I. issuing an additional command from said processor;

J. responding to said additional command to accelerate and relatively move said tape read media and said scanning means to again scan said media in said first direction;

K. reversely counting character locations encountered up to said one character location; and L. recognizing a preselected count status indicative of reaching said one character location to again initiate reading of said one character location and subsequent character locations.

9. The method of claim 8, wherein:

said first command and said additional commands are Read commands initiating normal reading of characters in said first direction.

10. The method of claim 8, wherein:

said first and additional commands are Write-Backspace commands initiating a pseudowrite operation to effect scanning of said media in said first direction a selected number of character locations determined by said processor.

11. The method of claim 7, wherein:
said command is a Read command.

12. The method of claim 7, wherein:
said command is a Write-Backspace command.

13. The method of claim 7, wherein:
said condition in step D is an error condition in transferred characters sensed by said processor.

14. The method of claim 7, wherein:
said condition in step D is a change in commands issued by said processor.

15. The method of claim 7, wherein:
said condition in step D is nonacceptance of characters by said processor.

16. The method of claim 15, wherein:
nonacceptance of characters by said processor is recognized internally in said tape unit by checking of the status of character registers connected in the transfer path 17. Apparatus for referencing a media location on a media having a plurality of discrete locations and repositioning said media, comprising:
scanning means;
means initiating a reading operation by relatively moving said media and said scanning means to scan locations on said media in a first direction;
means for terminating said reading operation at one of said locations;
means for decelerating and terminating relative movement of said media and said scanning means at a location beyond said one location;
means for repositioning said media by relatively moving said media and said scanning means to scan locations on said media in the opposite direction at least a predetermined number of locations past said one location establish an acceleration zone;
means for decelerating and terminating said opposite relative movement of said media and said scanning means;
counting means; and
control means for operating said counting means to reference said one location by:
1. forwardly counting media locations encountered during the interval defined by termination of said reading operation at said one location and termination of relative movement in said first direction;
2. reversely counting media locations encountered back to said one location during scanning of said media in the opposite direction; and the number of locations encountered past said one location including at least said predetermined number of locations and any additional locations encountered prior to deceleration and termination of opposite relative movement.

18. The apparatus of claim 17, wherein:
said apparatus comprises a media transport unit interconnected with a data processor, and wherein initiation of said reading operation by relative movement of said media and said scanning means to scan said media in said first direction and termination of said reading operation occur in response to commands emanating from said processor.

19. The apparatus of claim 17, further comprising:
means in said first direction moving means that is further operable to accelerate and relatively move said media and said scanning means to again scan locations on said media in said first direction;
means in said control means for operating said counting means to count media locations encountered up to said one location; and
means in said control means for recognizing preselected a count status indicative of reaching said one location to initiate reading of said one location and subsequent locations.

20. The apparatus of claim 19, wherein:
said apparatus comprises a media transport unit interconnected with a data processor, and wherein
initiation of reading of said media in said first direction both prior to and subsequent to a repositioning operation occurs in response to commands emanating from said processor.

21. Apparatus for referencing a character location on a tape record media having a plurality of discrete locations and repositioning said media, comprising:
scanning means;
means for initiating a reading operation by relatively moving said tape record media and said scanning means to scan character locations on said media in a first direction;
means for terminating said reading operation at one of said character locations;
means for decelerating and terminating relative movement of said tape record media and said scanning means at a character location beyond said one character location;
means for repositioning said media by relatively moving said tape record media and said scanning means to scan locations on said media in the opposite direction at least a predetermined number of character locations past said one character location to establish an acceleration zone;
means for decelerating and terminating said opposite relative movement of said tape record media and said scanning means;
counting means; and
control means for operating said counting means to reference said one character location by:
1. forwardly counting character locations encountered during the interval defined by termination of said reading operation at said one location and termination of relative movement in said first direction;
2. reversely counting character locations encountered back to said one character location during scanning of said media in the opposite direction; and
3. forwardly counting the number of character locations encountered past said one character location including at least said predetermined number of character locations and any additional locations encountered prior to deceleration and termination of scanning of said media in the opposite direction.

22. The apparatus of claim 21, further comprising:
means in said first direction moving means that is further operable to accelerate said tape record media and said scanning means again in said first direction;
means in said control means for operating said counting means to reversely count character locations encountered up to said one character location; and
means in said control means for recognizing a preselected count status indicative of reaching said one character location to initiate reading of said one character location and subsequent character locations.

23. Apparatus for referencing a character location on a tape record media having a plurality of discrete character locations and mounted for driving and scanning movement in a tape unit interconnected with a central processor, comprising:
means in said processor for issuing a read command;
means responding to said read command to initiate a reading operation by relatively moving said tape record media and a scanning means to read character locations on said media in a first direction;
means to supply characters to said processor as they are read;
means for terminating the reading operation at one of said character locations in response to a status condition;
means for decelerating and terminating relative movement of said tape record media and said scanning means at a character location beyond said one character location;
means for repositioning said media by relatively moving said tape record media and said scanning means to scan locations on said media in the opposite direction at least a predetermined number of character locations past said one character location to establish an acceleration zone;

means for decelerating and terminating said opposite relative movement of said tape record media and said scanning means;
counting means; and
control means for operating said counting means to reference said one character location by:
1. forwardly counting character locations encountered in the interval defined by termination of said reading operation at said one location and termination of relative movement in said first direction;
2. reversely counting character locations encountered back to said one character location during scanning of said media in the opposite direction; and
3. counting the number of character locations encountered past said one character location including at least said predetermined number of character locations and any additional locations encountered prior to deceleration and termination of scanning of said media in the opposite direction.

24. The apparatus of claim 23, wherein:
said command is a Pseudo-Write command to which said apparatus responds essentially as a read command.

25. The apparatus of claim 23, wherein:
said status condition is an error condition in transferred characters sensed by said processor.

26. The apparatus of claim 23, wherein:
said condition is a change in commands issued by said processor.

27. The apparatus of claim 23, wherein:
said status condition is nonacceptance of characters by said processor.

28. The apparatus of claim 27, further comprising:
means in said tape unit for recognizing nonacceptance of characters by said processor by checking of the status of character registers connected in the transfer path.

29. The apparatus of claim 23, further comprising:
means in said processor command means for issuing an additional command;
means in said first direction moving means responsive to said additional command to relatively move said tape record media and said scanning means to again scan locations on said media in said first direction;
means in said control means for operating said counting means to reversely count character locations encountered back to said one character location; and
means in said control means for recognizing a preselected count status indicative of reaching said one character location to again initiate reading of said one character location and subsequent character locations.

30. The apparatus of claim 29, wherein:
said first and additional commands are Write-Backspace commands initiating a pseudowrite operation to effect scanning of said media in said first direction a selected number of character locations as determined by said processor.

31. The apparatus of claim 29, wherein:
said first command and said additional command are Read commands initiating normal reading of characters by scanning character locations on said media in said first direction.

32. Apparatus for referencing a media location on a media having a plurality of discrete locations and repositioning said media, comprising:
scanning means;
means for initiating a transducing operation by relatively moving said media and said scanning mean to scan locations on said media in a first direction;
means for terminating said transducing operation at one of said locations;
means for decelerating and terminating relative movement of said media and said scanning means at a location beyond said one location;
means for repositioning said media by relatively moving said media and said scanning means to scan locations on said media in the opposite direction at least a predetermined number of locations past said one location to establish an acceleration zone;
means for decelerating and terminating said opposite relative movement of said media and said scanning means;
timing means coupled to said relative moving means for indicating the passage of individual locations on said media past said scanning means;
counting means; and
control means responsive to said timing means for operating said counting means to reference said one location by:
1. forwardly counting media locations encountered during the interval defined by termination of said transducing operation at said one location and movement in said first direction;
2. reversely counting media locations encountered back to said one location during scanning of said media in the opposite direction; and
3. forwardly counting the number of locations encountered past said one location including at least said predetermined number of locations and any additional locations encountered prior to deceleration and termination of scanning of said media in the opposite direction.

33. The apparatus of claim 32, further comprising:
means in said first direction moving means that is further operable to accelerate and relatively move said media and said scanning means to again scan locations on said media in said first direction;
means in said control means that is further responsive to said timing means to operate said counting means to reversely count media locations encountered up to said one location; and
means in said control means for recognizing a preselected count status indicative of reaching said one location to initiate transducing of said one location and subsequent locations.

34. Apparatus for referencing a character location on a tape record media having a plurality of discrete locations and repositioning said media, comprising:
scanning means;
means for initiating a transducing operation by relatively moving said tape record media and said scanning means to scan character locations on said media in a first direction;
means for terminating the transducing operation at one of said character locations;
means for decelerating and terminating relative movement of said tape record media and said scanning means at a character location beyond said one character location;
means for repositioning said media by relatively moving said tape record media and said scanning means to scan character locations on said media in the opposite direction at least a predetermined number of character locations past said one character location to establish an acceleration zone;
means for decelerating and terminating said opposite relative movement of said tape record media and said scanning means;
timing means coupled to said relative moving means, said timing means including in one to one correspondence with character locations on a media, individual timing indicia arranged in a coded format indicative of the direction of movement of said media;
direction memory means responsive to said indicia for storing representations of the same as they are encountered during movement of said media and said timing means, to thereby provide an indication of the direction of movement of said media;
counting means; and
control means responsive to said direction memory means and said timing means for operating said counting means to reference said one character location by:

1. forwardly counting character locations encountered during the interval defined by termination of said transducing operation at said one location and termination of movement in said first direction;
2. reversely counting character locations encountered back to said one character location during scanning of said media in the opposite direction; and
3. forwardly counting the number of character locations encountered past said one character location including at least said predetermined number of character locations and any additional locations encountered prior to deceleration and termination of scanning of said media in the opposite direction.

35. The apparatus of claim 34, further comprising:
means in said first direction moving means that is further operable to accelerate said tape record media and said scanning means to again scan locations on said media in said first direction;
means in said control means that is further responsive to said timing means to operate said counting means to reversely count character locations encountered up to said one character location; and
means in said control means for recognizing a preselected count status indicative of reaching said one character location to initiate transducing of said one character location and subsequent character locations.

36. The apparatus of claim 34, further comprising:
logical circuitry associated with said counting means and responsive to signals from said direction memory means, said timing means and said control means to provide incrementing and decrementing signals to operate said counting means.

37. The apparatus of claim 36, further comprising:
indicia means in said timing means arranged for recognition as 1, 2, 3, 1, 2, 3, etc.... in one direction of scanning of said media and as 3, 2, 1, 3, 2, 1, etc.... in an opposite direction of scanning of said media.

38. Apparatus for referencing a character location on a tape record media having a plurality of discrete character locations and mounted for driving and scanning movement in a tape unit interconnected with a central processor, comprising:
means in said processor for issuing a read command;
means responding to said read command to initiate a reading operation by relatively moving said tape record media and a scanning means to read character locations on said media in a first direction;
a first data register;
a second data register;
means interconnecting said scanning means, said first and second registers and said processor in that sequence for the transfer of characters as they are encountered during said reading operation;
means for terminating said reading operation at one of said character locations in response to a status condition;
means for decelerating and terminating relative movement of said tape record media and said scanning means at a character location beyond said one character location;
means for repositioning said media by relatively moving said tape record media and said scanning means to scan locations on said media in the opposite direction at least a predetermined number of character locations past said one character location to establish an acceleration zone;
means for decelerating and terminating said opposite relative movement of said tape record media and said scanning means;
counting means; and
control means for operating said counting means to reference said one character location by:
1. forwardly counting character locations encountered in the interval defined by termination of said transducing operation at said one location and termination of relative movement in said first direction;
2. reversely counting character locations encountered back to said one character location during scanning of said media in the opposite direction; and
3. forwardly counting the number of character locations encountered past said one character location including at least said predetermined number of character locations and any additional locations encountered prior to deceleration and termination of scanning of said media in the opposite direction.

39. The apparatus of claim 38, further comprising:
overrun means settable for initiating said repositioning procedure; and
means responsive to recognition of a full status of said registers, an error, or a change in command from said processor for setting said overrun means.

40. The apparatus of claim 38, further comprising:
register status means for indicating the empty and full condition of said registers, and
overrun means responsive to a full indication from said register status means for terminating said reading operation and initiating said repositioning procedures.

41. The apparatus of claim 40, further comprising:
means to render said overrun means ineffective if a said register becomes available to store data prior to actual control initiation of an overrun and repositioning operation.

42. The apparatus of claim 38, further comprising:
means in said processor command means for issuing an additional command;
means in said first direction moving means responsive to said additional command to relatively move said media and said scanning means to again scan locations on said media in said direction;
means in said control means for operating said counting means to reversely count character locations encountered back to said one character location; and
means in said control means for recognizing a preselected count status indicative of reading said one character location to again initiate reading of said one character location and subsequent character locations.

43. The apparatus of claim 42, further comprising:
overrun means settable for initiating said repositioning procedure and resettable following a repositioning operation; and
means responsive to a full status of said registers or reading of a predetermined character from said media for setting said overrun means; and
first reset means operative following a repositioning operation and responsive to receipt of a read command as said additional command to reset said overrun means;
means controlled by said first set means to initiate relative driving movement in a forwardly direction along said media corresponding to said first direction;
second reset means responsive to receipt of a Pseudo-Write command as said additional command to reset said overrun means;
means controlled by said second reset means to initiate relative driving movement reversely along said media; and
third reset means operative upon termination of either of said commands or receipt of an unload command to reset said overrun means and to condition said apparatus to a standby status.

44. Apparatus for referencing a character location on a tape record media having a plurality of discrete character locations and mounted for driving and scanning movement in a tape predetermined interconnected with a central processor, comprising:
means in said processor for issuing a read command;
means responding to said read command to initiate a reading operation by relatively moving said tape record media and a scanning means to read character locations on said media in a first direction;
a first data register;
a second data register;

means interconnecting said scanning means, said first and second registers and said processor in that sequence for the transfer of characters as they are encountered during said reading operation;

means for terminating the said reading operation at one of said character locations in response to a status condition;

means for decelerating and terminating relative movement of said tape record media and said scanning means at a character location beyond said one character location;

means for repositioning said media by relatively moving said tape record media and said scanning means to scan locations on said media in the opposite direction at least a predetermined number of character locations past said one character location to establish an acceleration zone;

means for decelerating and terminating said opposite relative movement of said tape record media and said scanning means;

timing means coupled to said relative moving means, said timing means including in one to one correspondence with character locations on a media individual timing indicia arranged in a coded format indicative of the direction of movement of said media;

direction memory means responsive to said indicia for storing representations of the same as they are encountered during movement of said media and said timing means, to thereby provide an indication of the direction of movement of said media;

counting means; and control means responsive to said direction memory means and said timing means to reference said one character location by:

1. forwardly counting character locations encountered during the interval defined by termination of said reading operation at said one location and termination of movement in said first direction;
2. reversely counting character locations encountered up to said one character location during scanning of said media in the opposite direction; and
3. forwardly counting the number of character locations encountered past said one character location including at least said predetermined number of character locations and any additional locations encountered prior to deceleration and termination of scanning of said media in the opposite direction.

45. The apparatus of claim 44, further comprising:

logical circuitry associated with said counting means and responsive to signals from said direction memory means, said timing means and said control means to provide incrementing and decrementing signals to operate said counting means.

46. The apparatus of claim 44, further comprising:

means for rendering said counting means free-running prior to a scan termination;

means to reset said counting means; and means in said control means to initiate counting by said counting means.

47. The apparatus of claim 44, further comprising:

means in said first direction moving means that is further operable to accelerate said tape record media and said scanning means to again scan locations on said media in said first direction;

means in said control means that is further responsive to said timing means to operate said counting means to reversely count character locations encountered up to said one character location; and means in said control means for recognizing a preselected count status indicative of reaching said one character location to initiate reading of said one character location and subsequent character locations.

48. The apparatus of claim 47, further comprising:

means in said processor to provide a read command to initiate a read operation by establishing scanning of said media in a preferred direction and a Pseudo-Write command establishing scanning of said media in a direction opposite to said preferred direction, with the repositioning operation occurring in conversely opposite directions in each respective case; and means in said control means for recognizing a count of "1" in said counting means in a repositioning operation following a read command and a count of "3" in a repositioning operation following a Pseudo-Write command to select the required one character thereby compensating for the inclusion of the two data registers in the data transfer path.

49. The apparatus of claim 48, further comprising:

latch control means, including a Forward Stop latch, a Reverse latch, a Reverse Stop latch and a Forward latch;

set-reset means activated during a repositioning operation following a Read command to set and reset said latches in the order named;

and means controlled by said latch control means to operate said relative moving means and said counting control means in the sequence named to reposition said media.

50. The apparatus of claim 49, further comprising:

means in said set-reset means for operating said latch control means during a repositioning operation following a Pseudo-Write command to set and reset said latches in the sequence Reverse Stop, Forward, Forward Stop, and Reverse; and means in said means controlled by said latch means for operating said relative moving means and said counting means in that sequence to reposition said media.